United States Patent
Loderer et al.

(10) Patent No.: US 11,724,239 B2
(45) Date of Patent: Aug. 15, 2023

(54) FRICTIONAL TEMPERATURE REGULATION OF A FLUID

(71) Applicant: Klueber Lubrication Muenchen SE & Co. KG, Munich (DE)

(72) Inventors: Dirk Loderer, Gilching (DE); Guenther Bodesheim, Munich (DE); Bastian Werner, Markt Schwaben (DE); Christian Koehler, Munich (DE); Anton Smola, Augsburg (DE); Dirk Ludwig, Olching (DE)

(73) Assignee: KLUEBER LUBRICATION MUENCHEN SE & CO. KG, Munich (DE)

( * ) Notice: Subject to any disclaimer, the term of this patent is extended or adjusted under 35 U.S.C. 154(b) by 759 days.

(21) Appl. No.: 16/722,062

(22) Filed: Dec. 20, 2019

(65) Prior Publication Data
US 2021/0190271 A1    Jun. 24, 2021

(51) Int. Cl.
| | | |
|---|---|---|
| *B01F 35/221* | (2022.01) | |
| *F24V 99/00* | (2018.01) | |
| *F17D 1/08* | (2006.01) | |
| *F17D 1/14* | (2006.01) | |
| *F17D 1/17* | (2006.01) | |
| *F17D 1/18* | (2006.01) | |

(Continued)

(52) U.S. Cl.
CPC ........ *B01F 35/2215* (2022.01); *B01F 23/411* (2022.01); *B01F 27/2711* (2022.01);
(Continued)

(58) Field of Classification Search
CPC ........... B01F 35/2115; B01F 35/21151; B01F 2035/99; B01F 35/2215; B01F 23/411;
(Continued)

(56) References Cited

U.S. PATENT DOCUMENTS

| | | | |
|---|---|---|---|
| 4,392,967 A | 7/1983 | Alexander | |
| 4,833,175 A * | 5/1989 | Boyce ..................... | B29B 7/407 521/154 |

(Continued)

FOREIGN PATENT DOCUMENTS

| | | |
|---|---|---|
| CN | 201459008 U | 5/2010 |
| CN | 110157524 A | 8/2019 |

(Continued)

OTHER PUBLICATIONS

"YSTRAL Z-Inline Disperser", Ystral 110% Mixing Solutions, found on https://ystral.com/en/machines/z-inlinedispersers/, before Nov. 14, 2019, pp. 1-3.

*Primary Examiner* — Atif H Chaudry
(74) *Attorney, Agent, or Firm* — Leydig, Voit & Mayer, Ltd.

(57) ABSTRACT

A production method can include flowing a heterogeneous fluid mixture into contact with a homogenizing cutting tool, measuring a fluid mixture temperature so as to obtain a measured fluid mixture temperature, and determining a target fluid mixture temperature. The fluid mixture can be frictionally heated so as to obtain a heated and homogenized fluid mixture by driving the cutting tool at a rate based on (i) the target fluid mixture temperature and (ii) the measured fluid mixture temperature. The heated and homogenized fluid mixture can be flowed away from the cutting tool.

20 Claims, 16 Drawing Sheets

(51) Int. Cl.
  *F17D 3/01* (2006.01)
  *B01F 27/271* (2022.01)
  *B01F 23/411* (2022.01)
  *B01F 27/86* (2022.01)
  *B01F 35/21* (2022.01)
  *B01F 35/90* (2022.01)

(52) U.S. Cl.
  CPC ........ *B01F 27/86* (2022.01); *B01F 35/21151* (2022.01); *F17D 1/084* (2013.01); *F17D 1/14* (2013.01); *F17D 1/17* (2013.01); *F17D 1/18* (2013.01); *F17D 3/01* (2013.01); *F24V 99/00* (2018.05); *B01F 2035/99* (2022.01)

(58) Field of Classification Search
  CPC ...... B01F 27/70; B01F 27/2711; B01F 27/50; B01F 27/86; B01F 27/906; F17D 1/18; F24V 40/00
  See application file for complete search history.

(56) References Cited

U.S. PATENT DOCUMENTS

| | | | |
|---|---|---|---|
| 6,685,981 | B1 * | 2/2004 | Lipp .................. A23G 3/0221 426/456 |
| 8,258,088 | B2 | 9/2012 | Bodesheim et al. |
| 9,994,787 | B2 | 6/2018 | Suetsugu |
| 2011/0320060 | A1 | 12/2011 | Batmaz et al. |
| 2013/0018141 | A1 | 1/2013 | Oda et al. |

FOREIGN PATENT DOCUMENTS

| | | |
|---|---|---|
| CN | 110449051 A | 11/2019 |
| DE | 102012105855 A1 | 1/2013 |
| JP | S58141298 A | 8/1983 |
| JP | 2004297853 A | 10/2004 |
| JP | 2015168806 A | 9/2015 |
| WO | WO 2008073773 A1 | 6/2008 |
| WO | WO 2015020001 A1 | 2/2015 |

* cited by examiner

FRICTIONAL TEMPERATURE REGULATION OF A FLUID

FIELD

Among other things, the present application discloses techniques for regulating the temperature of a fluid mixture through the controlled application of friction. A homogenizer (e.g., an inline disperser) can generate the friction by rotating a cutting tool submerged in the mixture.

BACKGROUND

Production of materials such as grease can involve heating of fluid. Heating can be accomplished through fluid temperature conditioning or electrical (also called "resistive") temperature conditioning. An example of fluid temperature conditioning is flowing a heated (e.g., kettle-conditioned) or cooled working fluid through a heat exchanger in thermal communication with the target material. An example of electrical temperature conditioning is flowing electric current through resistive heating elements in thermal communication with the target material.

Grease, such as urea grease, can be used to lubricate and/or cool mechanical interfaces. For example, grease can appear within bearings (e.g., roller bearings) to ensure that a load and heat transferring film separates the races from the roller elements. U.S. Pat. No. 8,258,088 to Bodesheim et al. (assigned to Klüber Lubrication München KG and hereby incorporated by reference) discloses exemplary grease applications and compositions.

SUMMARY

Disclosed is a production method, which can include: flowing a heterogeneous fluid mixture into contact with a homogenizing cutting tool, measuring a fluid mixture temperature so as to obtain a measured fluid mixture temperature, and determining a target fluid mixture temperature. The fluid mixture can be frictionally heated so as to obtain a heated and homogenized fluid mixture by driving the cutting tool at a rate based on (i) the target fluid mixture temperature and (ii) the measured fluid mixture temperature. The heated and homogenized fluid mixture can be flowed away from the cutting tool.

Disclosed is a production system that can include a processing system and a homogenizing cutting tool. The production system can be configured to: flow a heterogeneous fluid mixture into contact with the homogenizing cutting tool; frictionally heat the fluid mixture by driving the cutting tool so as to obtain a heated and homogenized fluid mixture; and flow the heated and homogenized fluid mixture away from the cutting tool.

The processing system can include one or more processors configured to: measure a fluid mixture temperature so as to obtain a measured fluid mixture temperature and determine a target fluid mixture temperature; and drive the cutting tool at the rate based on (i) the target fluid mixture temperature and (ii) the measured fluid mixture temperature.

Disclosed is a urea grease production system that can include a first tank, a second tank, a premixer, and a first inline disperser. The first tank can be for storing the first precursor and the second tank can be for storing a second precursor. The premixer can be for producing a first fluid mixture comprising urea thickener particles heterogeneously dispersed in a base oil from the first precursor and the second precursor.

The premixer can be disposed downstream of the first and second tanks and include: a first inlet for receiving the first precursor, a second inlet for receiving the second precursor, a stirring assembly disposed in a mixing chamber for producing the first fluid mixture, and an outlet for continuously flowing the first fluid mixture toward the first inline disperser.

The first inline disperser can be for producing a second fluid mixture comprising urea grease by heating and homogenizing the first fluid mixture. The first inline disperser can be disposed downstream of the premixer and include: an inlet for receiving the first fluid mixture, an outlet for flowing the second fluid mixture toward the second inline disperser, and a cutting tool disposed in a mixing chamber and including a plurality of radially alternating rotor stages and stator stages.

BRIEF DESCRIPTION OF THE DRAWINGS

Embodiments of the present invention will be described below based on the exemplary figures. The invention is not limited to the exemplary embodiments. All features described and/or illustrated herein can be used alone or combined in different combinations in embodiments of the invention. Although the relative dimensions shown in the figures serve as original support, the invention is not limited to any relative dimensions unless explicitly stated otherwise. The features and advantages of various embodiments of the present invention will become apparent by reading the following detailed description with reference to the attached drawings which illustrate the following.

DETAILED DESCRIPTION

I

Figure 1:
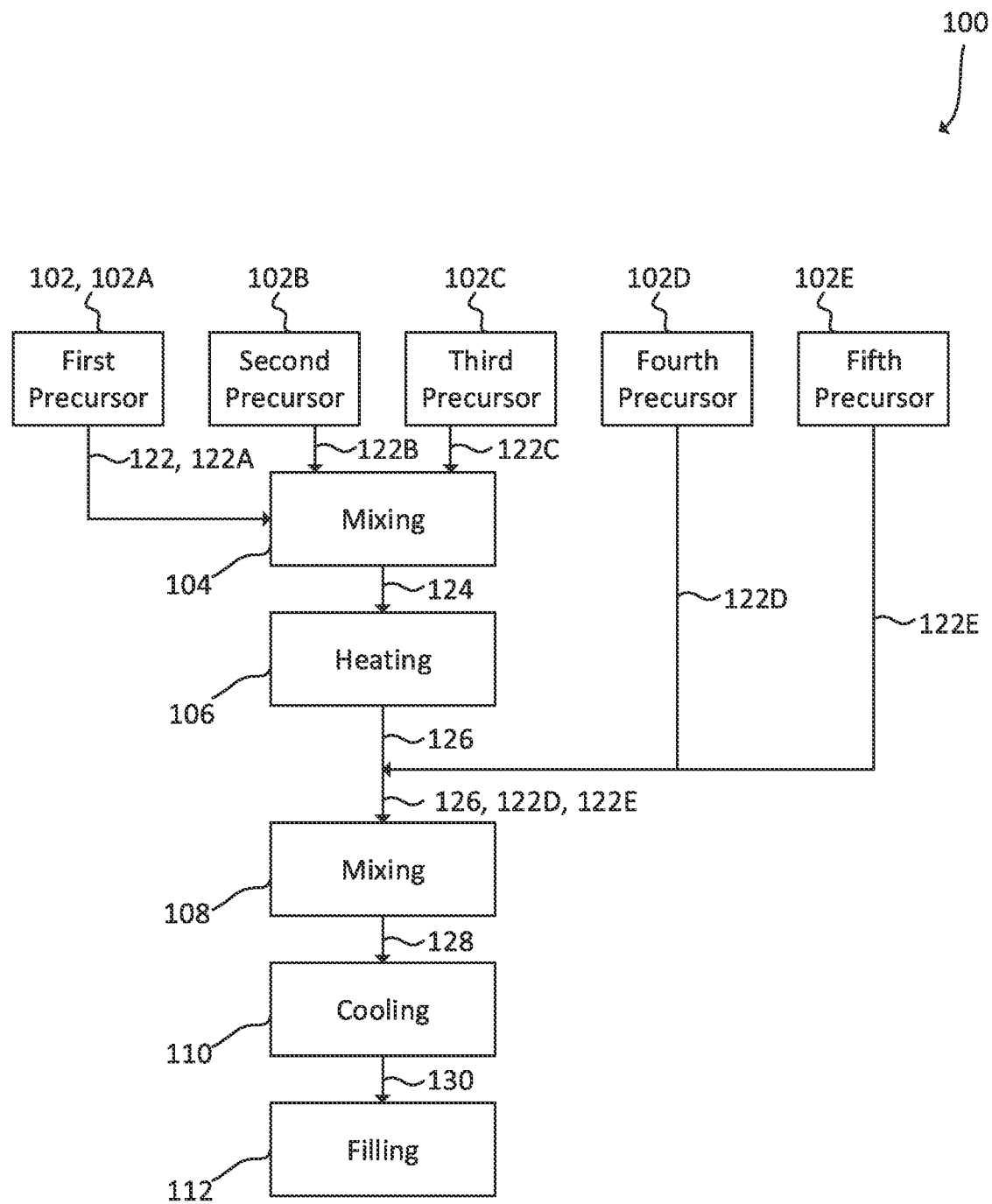
FIG. 1 is a block diagram of an exemplary chemical production system. The system can be used to produce lubricants such as urea grease. Alternatively, the system can be used to produce non-lubricant compounds.

FIG. 1 is a block diagram of a chemical production system 100. The present application describes features of production system 100 in the exemplary context of lubricant (e.g., urea grease) production. The subject matter disclosed in the present application, however, is not limited to any particular application or environment. Therefore, system 100 can be used to manufacture non-urea greases and/or non-grease chemical compounds.

Production system 100 can be configured to homogenize a first fluid mixture including agglomerated particles heterogeneously suspended within a base liquid. The homogenizing can yield a second mixture in which the particles are de-agglomerated and homogeneously dispersed within the base liquid. Regulating a temperature of the material experiencing homogenization can cause the second chemical mixture to exhibit desirable properties.

As discussed above, temperature regulation can include fluid and/or electrical temperature conditioning. Fluid/electrical temperature conditioning, however, can pose obstacles in the context of homogenization.

First, fluid/electrical temperature conditioning may be unable to uniformly regulate the temperature of material experiencing homogenization (also called "reacted material"). An unacceptable temperature gradient can form between reacted material directly adjacent the active fluid/electrical conditioning elements (e.g., fluid heat exchangers or resistors) and reacted material remote from the active fluid/electrical conditioning elements. During urea grease production, the fluid/electrical temperature conditioning elements may be required to occupy temperatures above (e.g., 30-50° C. above) a desired average temperature (e.g., 150-200° C.) of the urea grease. As a result, portions of the urea grease proximate the fluid/electrical temperature conditioning elements can exhibit 200-300° C. while remote portions may exhibit 150° C. Put differently, because urea grease has a low heat transfer coefficient, fluid or electrical temperature conditioning requires a large temperature gradient, which can lead to poor grease properties such as side reactions, oxidation, discoloration, cracking, and others.

Second, fluid and electrical temperature conditioning can suffer from an unacceptable hysteresis (also called "control lag") where the fluid/electrical temperature conditioning elements slowly implement desired temperature adjustments. In the meantime, the grease can be damaged.

Consequently, mixtures (e.g., urea greases) produced with fluid or electrical temperature conditioning can disadvantageously experience the above-discussed damage such as poor grease properties such as side reactions, oxidation, discoloration, cracking, and others. These effects can significantly impair mixture quality.

Addressing these obstacles, the present application discloses, among other things, temperature regulation through controlled application of friction (i.e., mechanical heating).

As further discussed below, frictional temperature regulation can be implemented by actively controlling forces (e.g., shear forces) reacted during a homogenizing process. For example, a rotational speed of an inline-disperser (also called a "homogenizer") driveshaft can be controlled based on a measured temperature (e.g., a measured temperature of reacted material exiting the inline-disperser) and a predetermined target temperature (e.g., a desired temperature of reacted material exiting the inline-disperser).

If the measured temperature exceeds the target temperature, then the rotational speed of the inline-disperser can be decelerated to decrease the amount of friction applied by a cutting tool while if the target temperature exceeds the measured temperature, then the rotational speed of the inline-disperser can be accelerated to increase the amount of friction applied by the cutting tool.

Because friction can be applied across the spinning surface area of the cutting tool, the reacted material can exhibit an advantageous uniform temperature (e.g., an acceptable temperature gradient). Because the rotational speed of the inline-disperser can be more responsive to command signals than the working fluid/resistive heating elements of fluid/electrical temperature conditioning systems, hysteresis can be advantageously reduced.

According to an embodiment, a homogenizer (e.g., second processing machine 106—further discussed below) performs frictional temperature regulation in conjunction with fluid/electrical temperature conditioning. According to another embodiment, the homogenizer performs frictional temperature regulation to the exclusion of fluid/electrical temperature conditioning. These embodiments are further discussed below.

II

Disclosed is a production method, which can include: flowing a heterogeneous fluid mixture into contact with a homogenizing cutting tool; measuring a fluid mixture temperature so as to obtain a measured fluid mixture temperature and determining a target fluid mixture temperature; frictionally heating the fluid mixture so as to obtain a heated and homogenized fluid mixture by driving the cutting tool at a rate based on (i) the target fluid mixture temperature and (ii) the measured fluid mixture temperature; and flowing the heated and homogenized fluid mixture away from the cutting tool.

In an embodiment, (i) the target fluid mixture temperature is a target temperature of the heated and homogenized fluid mixture and (ii) the measured fluid mixture temperature is a measured temperature of the heated and homogenized fluid mixture. In an embodiment, the heterogeneous fluid mixture includes urea thickener heterogeneously dispersed within a base oil and the heated and homogenized fluid mixture includes urea grease. In an embodiment, the fluid mixture is a lubricant. In an embodiment, the lubricant is selected from a group consisting of oils, emulsions, greases, soaps, and combinations thereof.

In an embodiment, the rate is a target rotational speed, the measured fluid mixture temperature is a current measured fluid mixture temperature, and the method further includes updating the target rotational speed based on (i) the target fluid mixture temperature, (ii) the current measured fluid mixture temperature, and (iii) an asymmetric deadband set. In an embodiment, the asymmetric deadband set includes an inner deadband and an outer deadband and the method further includes: updating the target rotational speed based on a deadband status of a previous measured fluid mixture temperature when the current measured fluid mixture temperature is outside the inner deadband and inside the outer deadband.

The method can include: updating the target rotational speed based on the deadband status of the previous measured fluid mixture temperature by: setting the updated target rotational speed as being equal to a current target rotational speed when the current measured fluid mixture temperature is outside the inner deadband, inside the outer deadband, and a last measured fluid mixture temperature inside the inner deadband is more recent than a last measured fluid mixture temperature outside the outer deadband; and calculating the updated target rotational speed based on a difference between the current measured fluid mixture temperature and the target temperature when the current measured fluid mixture temperature is outside the inner deadband, inside the outer deadband, and a last measured fluid mixture temperature inside the inner deadband is less recent than a last measured fluid mixture temperature outside the outer deadband.

The method can include quantizing the updated target rotational speed to one of a plurality of discrete values to lower a resolution of rotational speed control. The method can include: mixing a plurality of precursors into the heterogeneous fluid mixture; and determining the target fluid mixture temperature and the asymmetric deadband set based on a flow rate of each precursor.

In an embodiment, the homogenizing cutting tool includes a rotor affixed to a driveshaft and a stator, the rotor including a rotor ring disposed in a circumferential channel defined between sequential stator rings. The method can include: continuously flowing a plurality of precursors into a pre-mixer to produce the heterogeneous fluid mixture; continuously flowing the heterogeneous fluid mixture into an inlet of a first inline disperser including the homogenizing cutting tool; and continuously introducing an additive into the heated and homogenized fluid mixture at a location downstream of the first inline disperser and continuously flowing the combination within a second inline disperser including a second homogenizing cutting tool.

Disclosed is a production system including a processing system and a homogenizing cutting tool. The production system can be configured to: flow a heterogeneous fluid mixture into contact with the homogenizing cutting tool; frictionally heat the fluid mixture by driving the cutting tool so as to obtain a heated and homogenized fluid mixture; and flow the heated and homogenized fluid mixture away from the cutting tool.

In an embodiment, the processing system includes one or more processors configured to: measure a fluid mixture temperature so as to obtain a measured fluid mixture temperature and determine a target fluid mixture temperature; and drive the cutting tool at the rate based on (i) the target fluid mixture temperature and (ii) the measured fluid mixture temperature.

In an embodiment, (i) the target fluid mixture temperature is a target temperature of the heated and homogenized fluid mixture and (ii) the measured fluid mixture temperature is a measured temperature of the heated and homogenized fluid mixture. In an embodiment, the heterogeneous mixture includes urea thickener heterogeneously dispersed within a base oil and the heated and homogenized mixture includes urea grease.

The production system can be configured to: continuously flow a plurality of precursors into a pre-mixer to produce the heterogeneous fluid mixture; continuously flow the heterogeneous fluid mixture into an inlet of a first inline disperser including the homogenizing cutting tool; and continuously introduce an additive into the heated and homogenized fluid mixture and continuously flowing the combination within a second inline disperser including a second homogenizing cutting tool.

In an embodiment, the rate is a target rotational speed, the measured fluid mixture temperature is a current measured fluid mixture temperature, and the one or more processors are configured to: update the target rotational speed based on (i) the target fluid mixture temperature, (ii) the current measured fluid mixture temperature, and (iii) an asymmetric deadband set including an inner deadband and an outer deadband.

The production system can be configured to update the target rotational speed based on a deadband status of a previous measured fluid mixture temperature when the current measured fluid mixture temperature is outside the inner deadband and inside the outer deadband by: setting the updated target rotational speed as being equal to a current target rotational speed when the current measured mixture temperature is outside the inner deadband, inside the outer deadband, and a last measured mixture temperature inside the inner deadband is more recent than a last measured mixture temperature outside the outer deadband; and calculating the updated target rotational speed based on a difference between the current measured mixture temperature and the target temperature when the current measured mixture temperature is outside the inner deadband, inside the outer deadband, and a last measured mixture temperature inside the inner deadband is less recent than a last measured mixture temperature outside the outer deadband.

Disclosed is a urea grease production system including a first tank, a second tank, a premixer, and a first inline disperser. The first tank can be for storing a first precursor and the second tank can be storing a second precursor. The premixer can be for producing a first fluid mixture including urea thickener particles heterogeneously dispersed in a base oil from the first precursor and the second precursor. The premixer can be disposed downstream of the first and second tanks and include: a first inlet for receiving the first precursor, a second inlet for receiving the second precursor, a stirring assembly disposed in a mixing chamber for producing the first fluid mixture, and an outlet for continuously flowing the first fluid mixture toward the first inline disperser.

The first inline disperser can be for producing a second fluid mixture including urea grease by heating and homogenizing the first fluid mixture. The first inline disperser can be disposed downstream of the premixer and include: an inlet for receiving the first fluid mixture, an outlet for flowing the second fluid mixture toward the second inline disperser, and a cutting tool disposed in a mixing chamber and including a plurality of radially alternating rotor stages and stator stages.

In an embodiment, the stirring assembly includes: a stator assembly including a plurality of longitudinally displaced columns statically disposed within the mixing chamber; and a driveshaft mounting multiple paddles, a plurality of which are configured to rotate through gaps defined between consecutive columns.

The production system can include a processing system including one or more processors configured to: control a rotational speed of the plurality of rotor stages based on a target fluid mixture temperature, a measured fluid mixture temperature, and an asymmetric deadband set including an inner deadband and an outer deadband.

In an embodiment, the measured fluid mixture temperature is a measured current fluid mixture temperature, the asymmetric deadband set includes an inner deadband and an outer deadband, and the one or more processors are configured to: control the rotational speed of the plurality of rotor stages based on a deadband status of a measured previous fluid mixture temperature when the measured current fluid mixture temperature is outside the inner deadband and inside the outer deadband. In an embodiment, the one or more processors are configured to: quantize a target rotational speed of the plurality of rotor stages to one of a plurality of predetermined discrete values to reduce a resolution of rotational speed control.

III

Referring to FIG. 1, a plurality of different precursor chemicals 122, 122A, 122B, 122C, 122D, 122E (also called "doses", "solutions", "fluids", or "substances") can be independently stored in tanks 102, 102A, 102B, 102C, 102D, 102E (also called "supplies"). Each tank 102 can include active heating and/or stirring features. Precursor chemicals 122 can be homogeneous fluids, heterogeneous fluids in which solids are suspended, or solids. Although five are shown, any number of precursors (e.g., two, ten, etc.) can be provided.

Each precursor 122 can flow toward a downstream processing machine in a predetermined stoichiometric ratio. In FIG. 1, first, second, third precursors 122A, 122B, 122C are configured for direct flow into a first processing machine 104 (also called a "mixer" and a "pre-mixer") while fourth and fifth precursors 122D, 122E are configured for direct flow into a fluid line directly upstream of a third processing machine 106.

According to an embodiment, first tank 102A can store amine dissolved in oil as a first precursor 122A while second tank 102B can store isocyanate dissolved in oil as a second precursor 122B. The isocyanate dissolved in oil can be stored at 50-60° C. and continuously stirred within second tank 102B. Third tank 102C and third precursor 122C can be absent. Fourth tank 102D can store additives mixed in oil. Fifth tank 102E can store pure oil.

According to another embodiment, first tank 102A can store pure amine as first precursor 122A, second tank 102B can store pure isocyanate as a second precursor 122B, third tank 102C can store pure oil as a third precursor 122C, fourth tank 102D can store first additives mixed in oil, and fifth tank 102E can store second additives mixed in oil or pure oil.

Additives can include one or more of: chelate compounds, radical scavengers, UV stabilizers, reaction layer forming agents, organic or inorganic solid lubricants (e.g., polyimides, polytetrafluoroethylene (PTFE), graphite, metal oxides, boron nitride, molybdenum sulfide and phosphate). Additives can additionally or alternatively include one or more of: compounds containing phosphorus and sulfur (e.g., zinc dialkyl dithiophosphate), boric acid esters as antiwear/extreme pressure additives, aromatic amino, phenols, sulfur compounds as antioxidants, metal salts, esters, nitrogen compounds, heterocyclic compounds as agents to prevent corrosion, glycerol mono- or diesters as friction preventives, and polyisobutylene or polymethacrylate as viscosity enhancers.

Although FIG. 1 illustrates parallel flow of the precursor chemicals into first processing machine 104, other flow paths are contemplated. For example, first precursor 122A can mix with second precursor 122B upstream of first processing machine 104 and the resulting combination can mix with third precursor 122C within first processing machine 104. The same concept applies to the additive flow paths.

First processing machine 104 can be configured to continuously output a first mixture 124 (also called a "fluid", a "first fluid mixture", and "first intermediate composition"). In an embodiment, the precursor chemicals 122 react within first processing machine 104 to continuously yield urea thickener in oil as first mixture 124. In an embodiment, the urea thickener can be formed by a divalent isocyanate and a monovalent amine in a molar ratio of 1:2. First mixture 124 can be formed as a viscous fluid including agglomerated particles heterogeneously suspended within a base liquid. As discussed below, system 100 can transform first mixture 124 into a second mixture 126, and second mixture 126 into a third mixture 128, etc. The numerical labels can identify location and not necessarily an irreversible chemical reaction. For example, fourth mixture 130 can be the same compound as third mixture 128. As used herein, fluids can be highly viscous semi-solids.

In an embodiment, first processing machine 104 can include multiple (e.g., two, three) pre-mixers (further discussed below) connected in series. Precursors 122 can enter the first of the pre-mixers. First mixture 124 can flow from the last of the pre-mixers.

First mixture 124 (e.g., the urea thickener in oil) can continuously flow from first processing machine 104 into a second processing machine 106, which can heat and/or mix first mixture 124 to produce second mixture 126 (also called a "second intermediate composition"). First mixture 124 can exhibit a higher viscosity while second mixture 126 can exhibit a lower viscosity. In an embodiment, second processing machine 106 is an inline disperser (also called a "homogenizer") configured to blend first mixture 124 into second mixture 126.

The inline disperser can include a homogenizing cutting tool (e.g., a rotor/stator combination). Friction applied by the cutting tool (also called a "cutting assembly") can be controlled (e.g., via rotational speed regulation) to regulate temperature of the material reacted within second processing machine 106. In an embodiment, second mixture 126 is urea grease. Exemplary features of the homogenizer and control thereof are further discussed below.

In an embodiment, temperature of material reacted within second processing machine 106 is exclusively actively regulated through rotational speed control of the cutting tool. In an embodiment, friction between the reacted material and the cutting tool is responsible for at least 85, 90, 95, or 99% of heat absorbed into reacted material within second processing machine 106.

Heat absorbed into reacted material within second processing machine 106 can be measured by capturing the temperature, composition (and thus heat capacity), and/or mass flow rate of material entering second processing machine 106 (e.g., second mixture 126) and of material exiting second processing machine 106 (e.g., third mixture 128). Although temperature of material reacted within second processing machine 106 can be exclusively actively regulated through rotational speed control of the cutting tool, second processing machine 106 can include collateral temperature conditioning elements (e.g., fans) configured to cool internal mechanical/electrical components (e.g., motors, inverters, bearings).

Second mixture 126 can continuously egress from second processing machine 106 at a uniform temperature (e.g., exhibit a narrow temperature band such as less than 10, 5, 2, or 1° C.). Second mixture 126 can continuously flow into a third processing machine 108. As shown in FIG. 1, one or more precursors (e.g., fourth precursor 122D and fifth precursor 122E) can intersect second mixture 126 upstream of third processing machine 108.

In an embodiment, third processing machine 108 is a second inline disperser (i.e., "homogenizer") configured to blend second mixture 126, fourth precursor 122D (e.g., additives), and fifth precursor 122E (e.g., pure oil) into a homogeneous third mixture 128. The algorithm for controlling third processing machine 108 can be different than the algorithm for controlling second processing machine 106.

In an embodiment, the rotational speed of the cutting tool in third processing machine 108 is controlled independent of any mixture temperature. In another embodiment, the rotational speed of the cutting tool in third processing machine 108 is controlled via the same algorithm used for controlling rotational speed of the cutting tool in second processing machine 106.

Third processing machine 108 can continuously produce third mixture 128. In an embodiment, third mixture 128 is urea grease with homogeneously dispersed additives. Third mixture 128 can flow into a fourth processing machine 110. Fourth processing machine 110 can mix and/or cool third mixture 128. Fourth processing machine 110 can include active temperature conditioning (e.g., a refrigeration cycle including a heat exchanger, a fan, etc.) for cooling third mixture 128.

Fourth processing machine 110 can be configured for non-continuous batch operation such that a predetermined amount of the continuously flowing third mixture 128 is metered into one fourth processing machine 110. Thereafter, a valve can switch such that the predetermined amount of the continuously flowing third mixture 128 is metered into another fourth processing machine 110, etc. From fourth processing machine 110, fourth mixture 130 can flow to a filling station 112.

Filling station 112 can meter predetermined quantities of fourth mixture 130 into respective tanks. The tanks can be sealed and commercially distributed. The techniques disclosed herein can be used to produce any lubricating grease composition disclosed in U.S. Pat. No. 8,258,088 to Bodesheim et al. (assigned to Klüber Lubrication München KG and hereby incorporated by reference).

Figure 2:
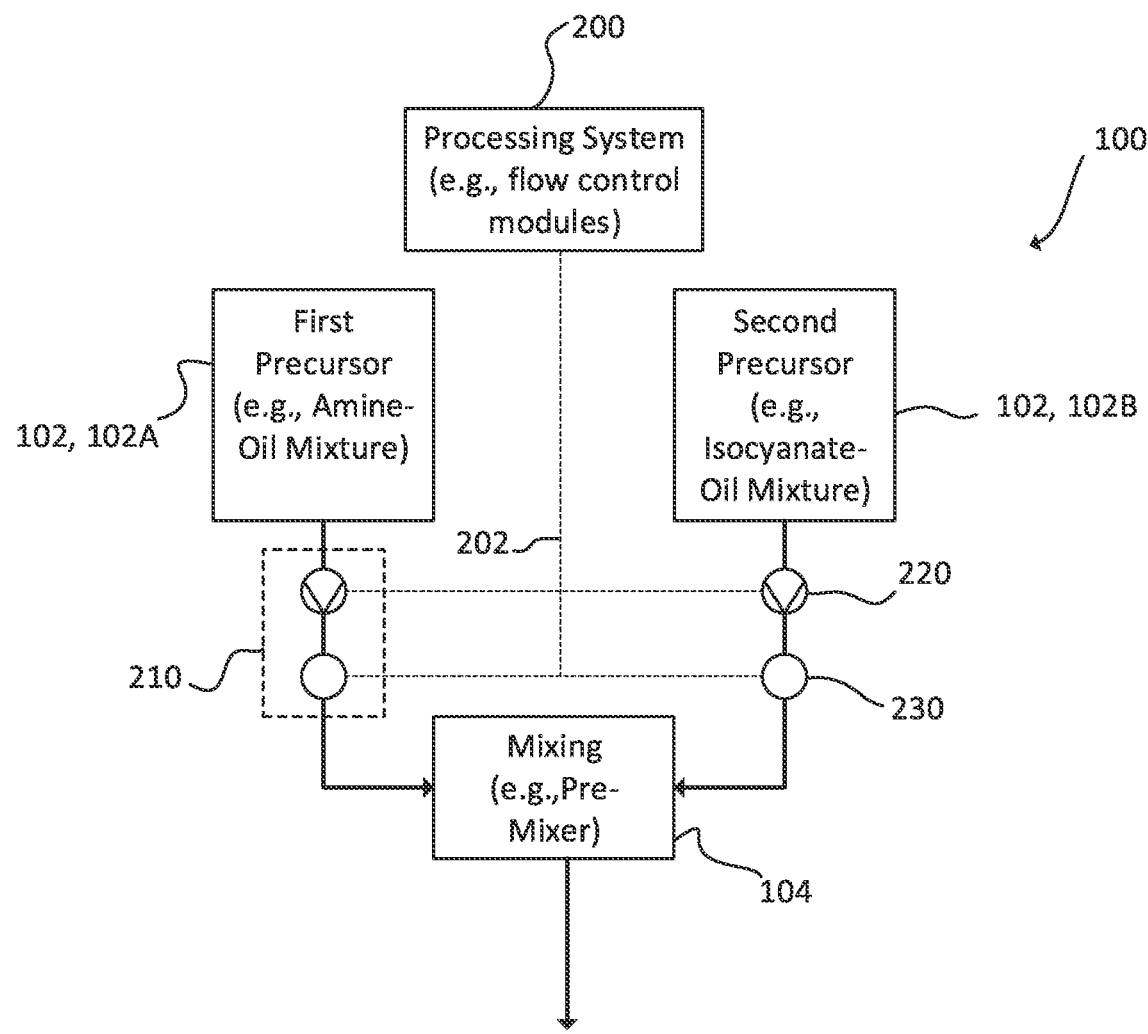
FIG. 2 is a block diagram of a portion of the exemplary chemical production system illustrating components of an exemplary flow control package.
Figure 3:
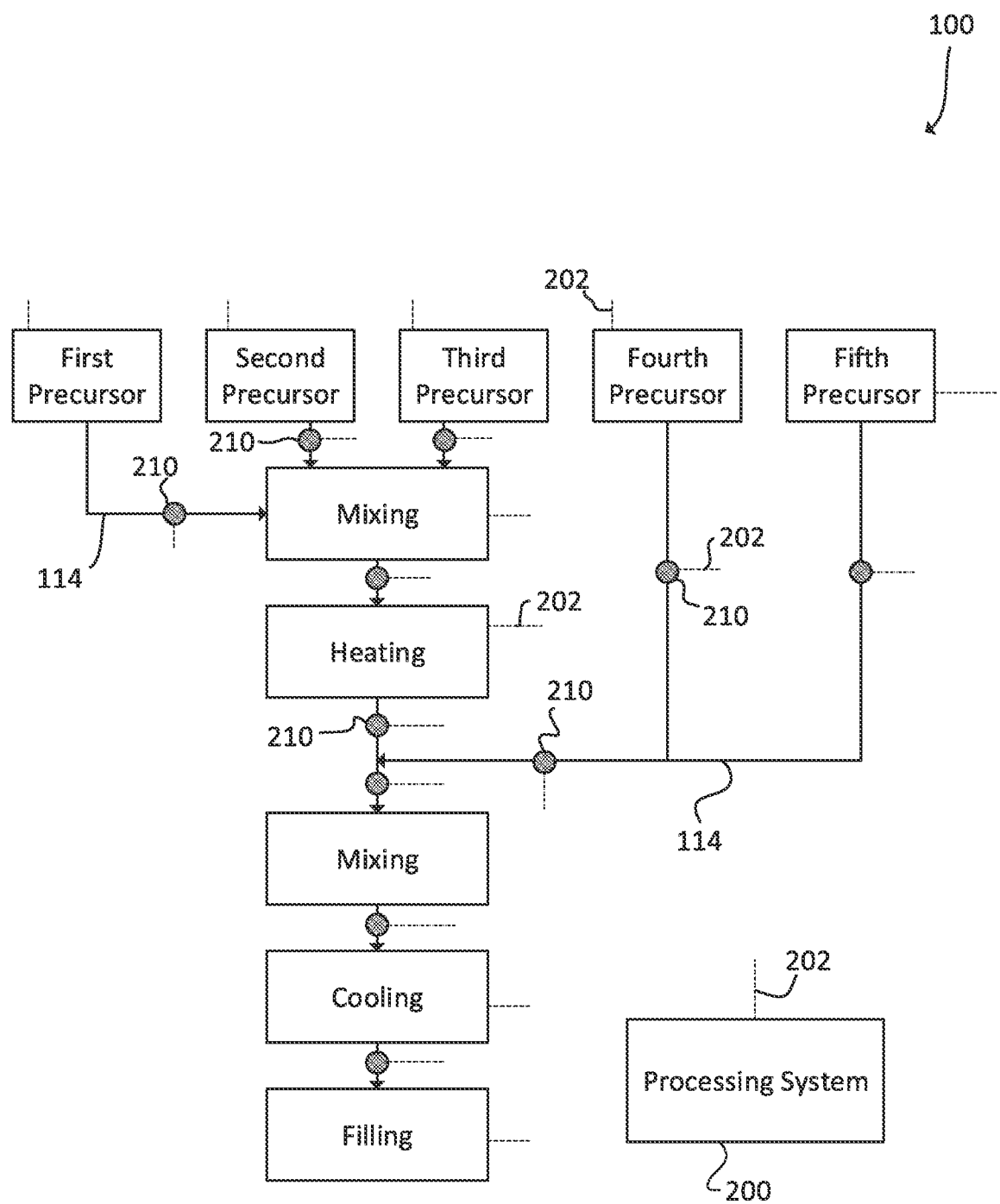
FIG. 3 is a block diagram of the exemplary chemical production system illustrating exemplary flow control package locations.

Referring to FIGS. 2 and 3, and as further discussed below, a processing system 200 can be configured to automatically implement each and every operation (e.g., function) disclosed herein. As shown in FIG. 2, a flow control package 210 can include one or more of a fluid actuator 220 (e.g., a fluid pump and/or valve) and a sensor package 230 (e.g., one or more of a mass/volume flow sensor (e.g., a Coriolis mass flow meter), a viscosity sensor, a pressure sensor, and a temperature sensor) can be disposed along any flow line 114 disclosed herein.

FIG. 3 illustrates exemplary locations of flow control packages 210 across chemical production system 100. For example, and as shown in FIG. 3, a respective flow control package 210 can be disposed along every flow line 114 of production system 100. A respective flow control package 210 can be disposed within each tank 102, processing machine 104-110, and filling station 112.

Referring to FIG. 3, processing system 200 can be configured to actively control (e.g., adjust) each fluid actuator 220 and any actuator (e.g., cutting tool) of tank 102, processing machines 104-110, and filling station 112. Processing system 200 can include a unidirectional or bidirectional wired or wireless communication path 202 (in FIG. 3, communication paths 202 are truncated for clarity) with each sensor and actuatable component.

IV

Figure 4:
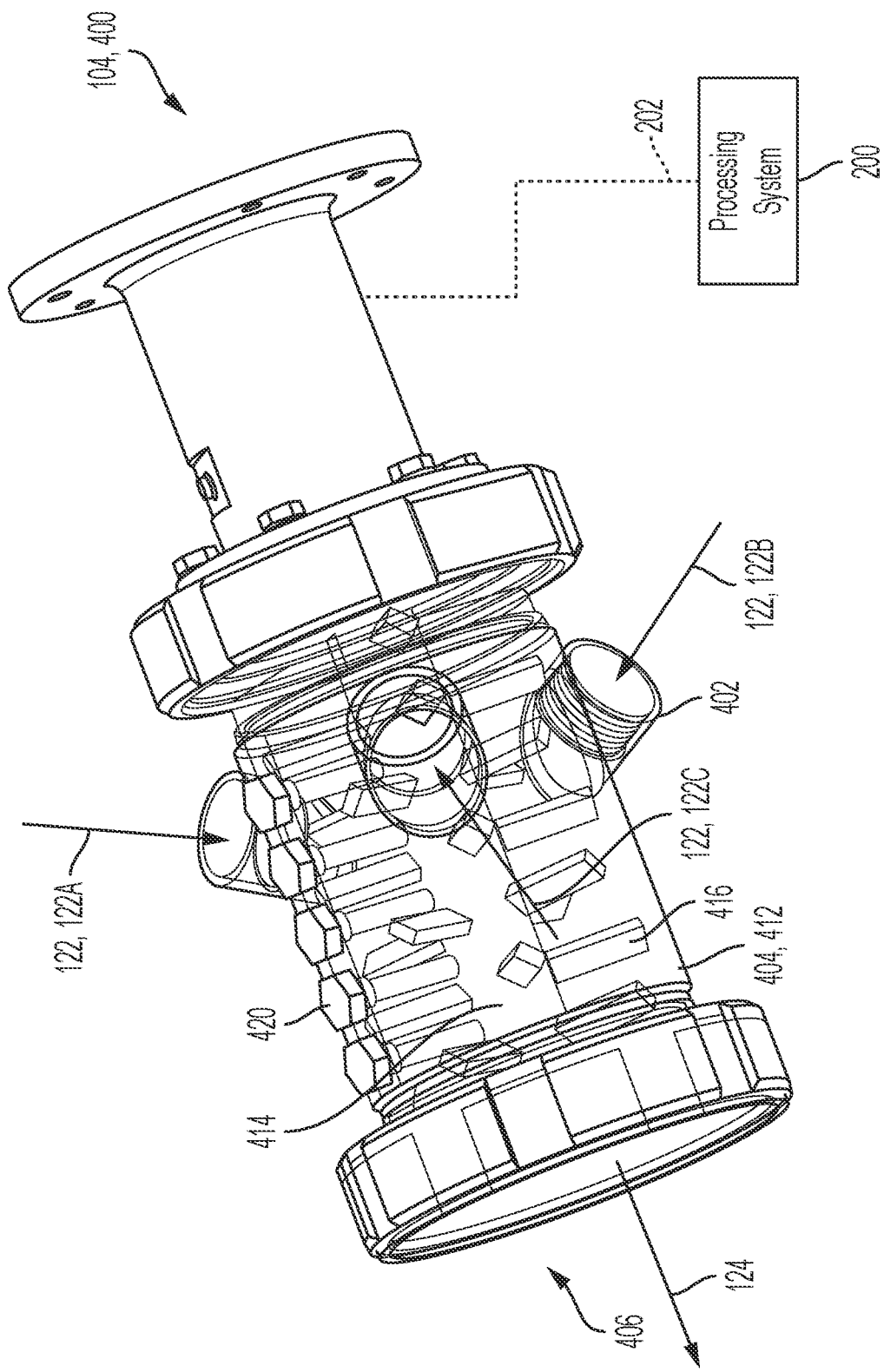
FIG. 4 is an isometric view of an exemplary processing machine for use in the exemplary chemical production system. The processing machine can perform pre-mixing.
Figure 5:
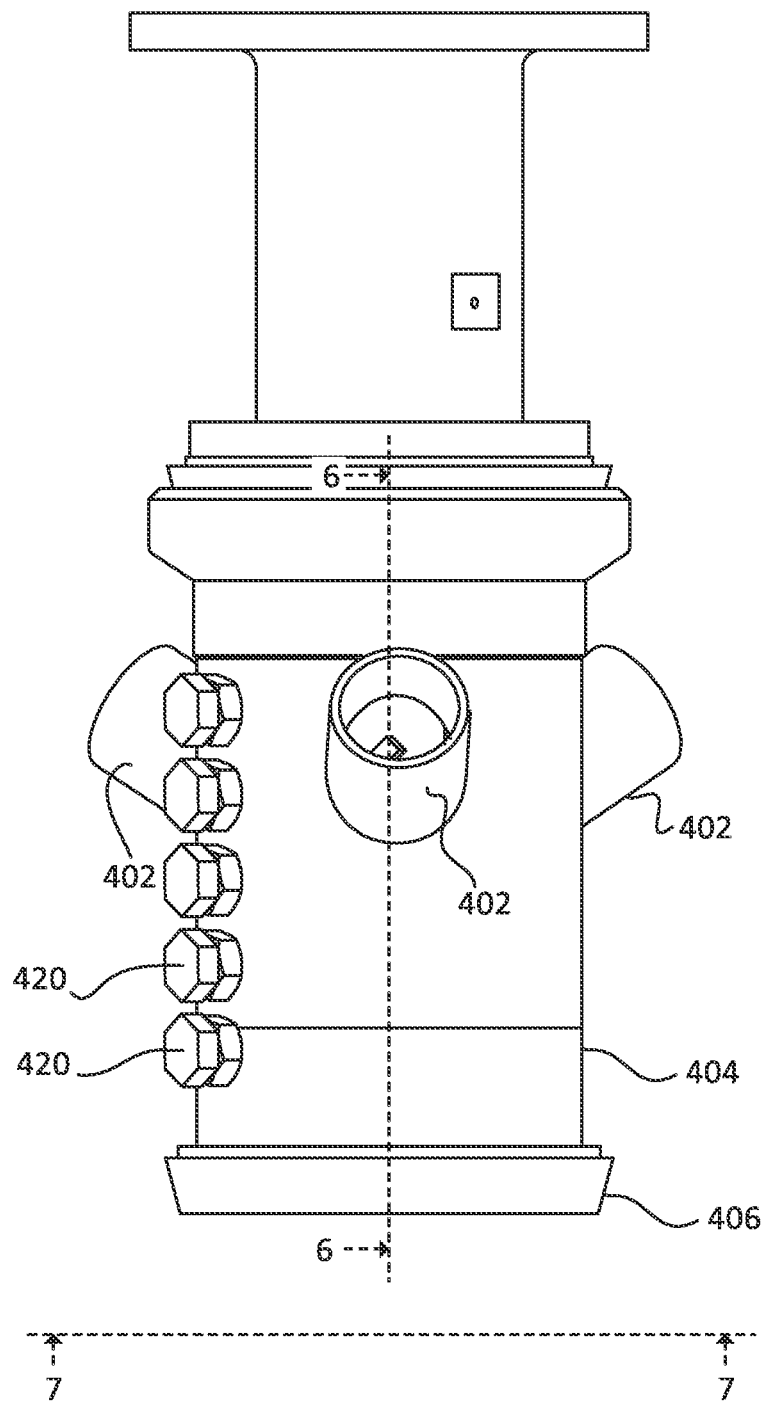
FIG. 5 is an elevational view of the exemplary pre-mixer of FIG. 4.
Figure 6:
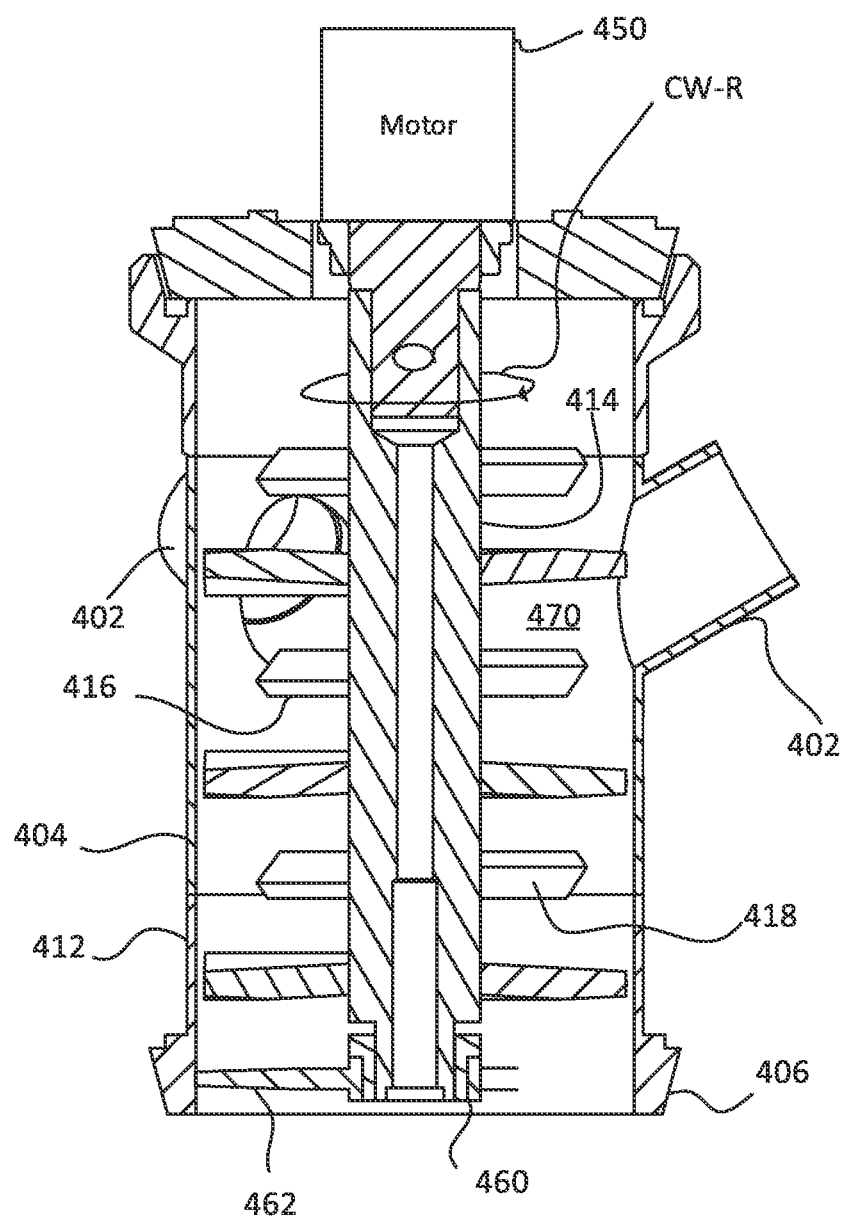
FIG. 6 is a cross-sectional elevational view of the exemplary pre-mixer of FIG. 4 from plane 6-6 in FIG. 5.
Figure 7:
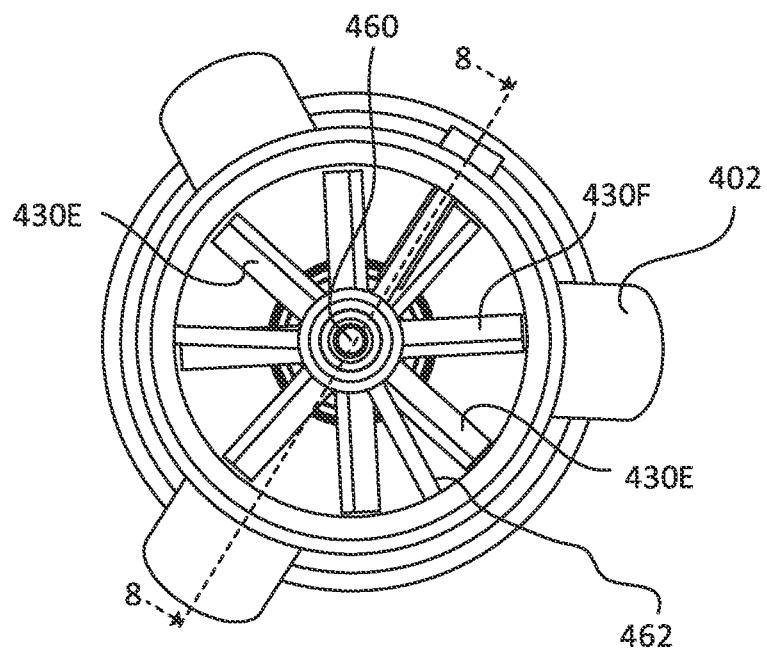
FIG. 7 is a bottom plan view of the exemplary pre-mixer of FIG. 4 from plane 7-7 in FIG. 5.
Figure 8:
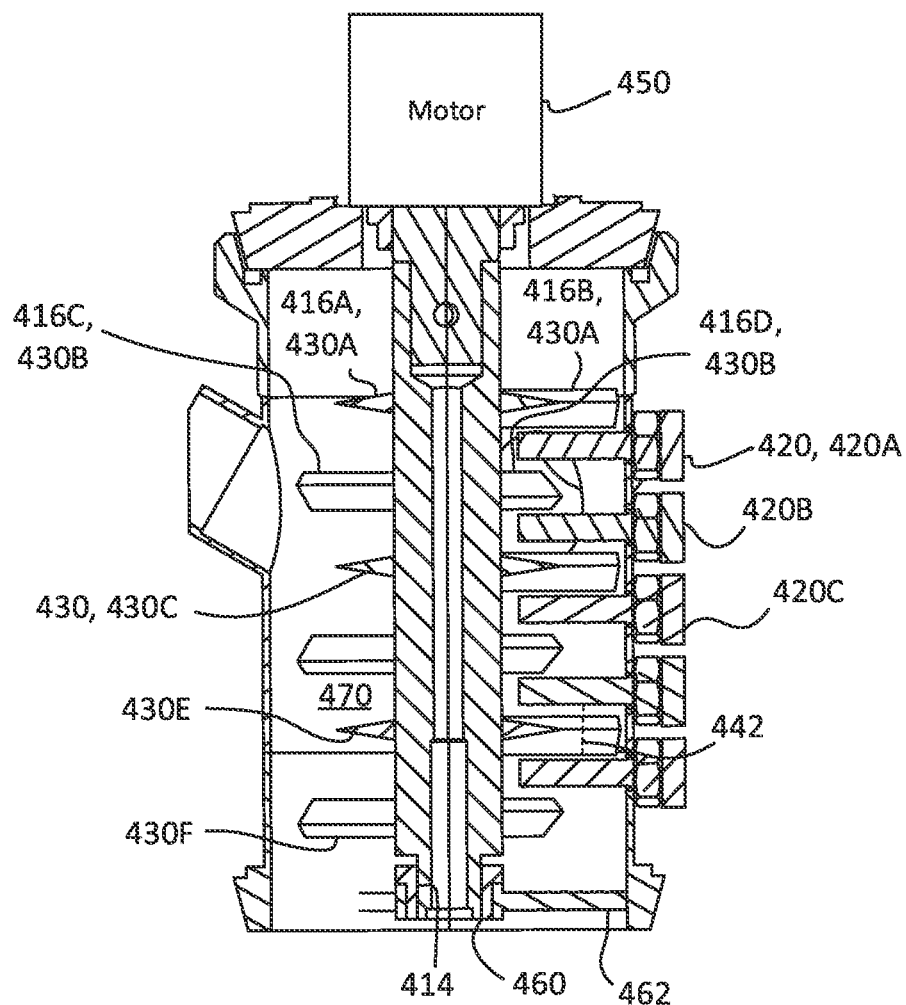
FIG. 8 is a cross-sectional elevational view of the exemplary pre-mixer of FIG. 4 from plane 8-8 in FIG. 7.

FIGS. 4-8 illustrate an exemplary pre-mixer 400. As described above, first processing machine 104 can include only one or a plurality of pre-mixers 400 connected in series. FIG. 4 is an isometric view of pre-mixer 400 when fully assembled. FIG. 5 is an elevational view thereof. FIG. 6 is a cross-sectional elevational view thereof from plane 6-6 in FIG. 5. FIG. 7 is a bottom plan view thereof from plane 7-7 in FIG. 5. FIG. 8 is a cross-sectional elevational view thereof from plane 8-8 in FIG. 7.

Pre-mixer 400 can be configured to continuously receive one or more precursors 122 and to continuously output first mixture 124. Referring to FIGS. 4-8, pre-mixer 400 can include a plurality of inlets 402, a core 404, and an outlet 406. Core 404 can include an annular outer cover 412 surrounding a driveshaft 414. An electric motor 450 can rotationally power driveshaft 414. Processing system 200 can control the rotational speed of driveshaft 414 through electric motor 450.

After ingressing via inlets 402, precursors 122 can mix in the annular chamber 470 defined between a static outer cover 412 and rotatable inner shaft 414. In an embodiment, each precursor 122 can remain separate until reaching the interior of pre-mixer 400. Multiple paddles 416 can radially extend from inner shaft 414 and radially terminate before contacting outer cover 412. The rotation of paddles 416 can facilitate mixing.

Each paddle 416 can be a prism (e.g., box-shaped) including a rectangular face 418 defining a predetermined angle (e.g., 45° with respect to the longitudinal axis of inner shaft 414. As shown in FIGS. 6 and 8, paddles 416 can be oriented such that during clockwise rotation CW-R (or counterclockwise according to another embodiment) of driveshaft 414, rectangular faces 418 push fluid within core 404 toward outlet 406.

To enhance stirring, rods 420 (also called stators) can extend through outer cover 412 and into inner shaft 414. Rods 420 can exhibit axial spacing 442 (FIG. 8) to enable uninterrupted rotation of paddles 416. Paddles 416 can extend from driveshaft 414 in sets 430 where each set occupies a respective plane normal to driveshaft 414. The combination of driveshaft 414, paddles 416, and rods 420 can be called a stirring assembly.

For example, and referring to FIG. 8, paddles 416A and 416B can form a first set 430A while paddles 416C and 416D can form a second set 430A. First set 430A (e.g., paddles 416A and 416B) can rotate in a plane above first rod 420A. Second set 430B (e.g., paddles 416C and 416D) can rotate in a plane between first rod 420A and second rod 420B. Third set 430C can rotate in a plane defined between second rod 420B and third rod 420C.

In an embodiment, each set 430 includes three, four, or five paddles 416 circumferentially disposed about driveshaft 414 at regular intervals. In FIGS. 4-8, each set 430 includes four regularly spaced paddles 416. As shown in FIGS. 7 and 8, consecutive sets (e.g., first set 430A and second set 430B) can be angularly offset by 45° while alternating sets (e.g., first set 430A and third set 430C) can be aligned (e.g., exhibit zero angular offset). As a result, only fifth set 430E and sixth set 430F of sets 430 visible from the plan perspective of FIG. 7.

Referring to FIGS. 6-8, a bearing assembly 460 (e.g., a roller bearing assembly) can be disposed within chamber 470. Radial supports 462 can extend from outer cover 412 to statically affix an outer race (not labeled) of bearing assembly 460. An inner race thereof (not labeled) can affixed to driveshaft 414 and rotatably journaled (e.g., via roller bearings) within the outer race.

In an embodiment (not shown), each of the precursors 122 to first mixture 124 combine within annular chamber 418 of a first pre-mixer 400. The resulting first mixture 124 is piped into the annular chamber 418 of a downstream second pre-mixer 400 to experience a second mixing process after which first mixture 124 is piped into the annular chamber 418 of a downstream third pre-mixer 400 to experience a third mixing process.

From the third pre-mixer 400, first mixture 124 can flow into second processing machine 106. Flow of first mixture 124 can be split downstream of the first pre-mixer 400/second pre-mixer 400 into multiple streams, which can merge via the multiple inlets of the second pre-mixer 400/third pre-mixer 400. Processing system 200 can control the speed of each pre-mixer 400 independently.

IV.1

Figure 9:
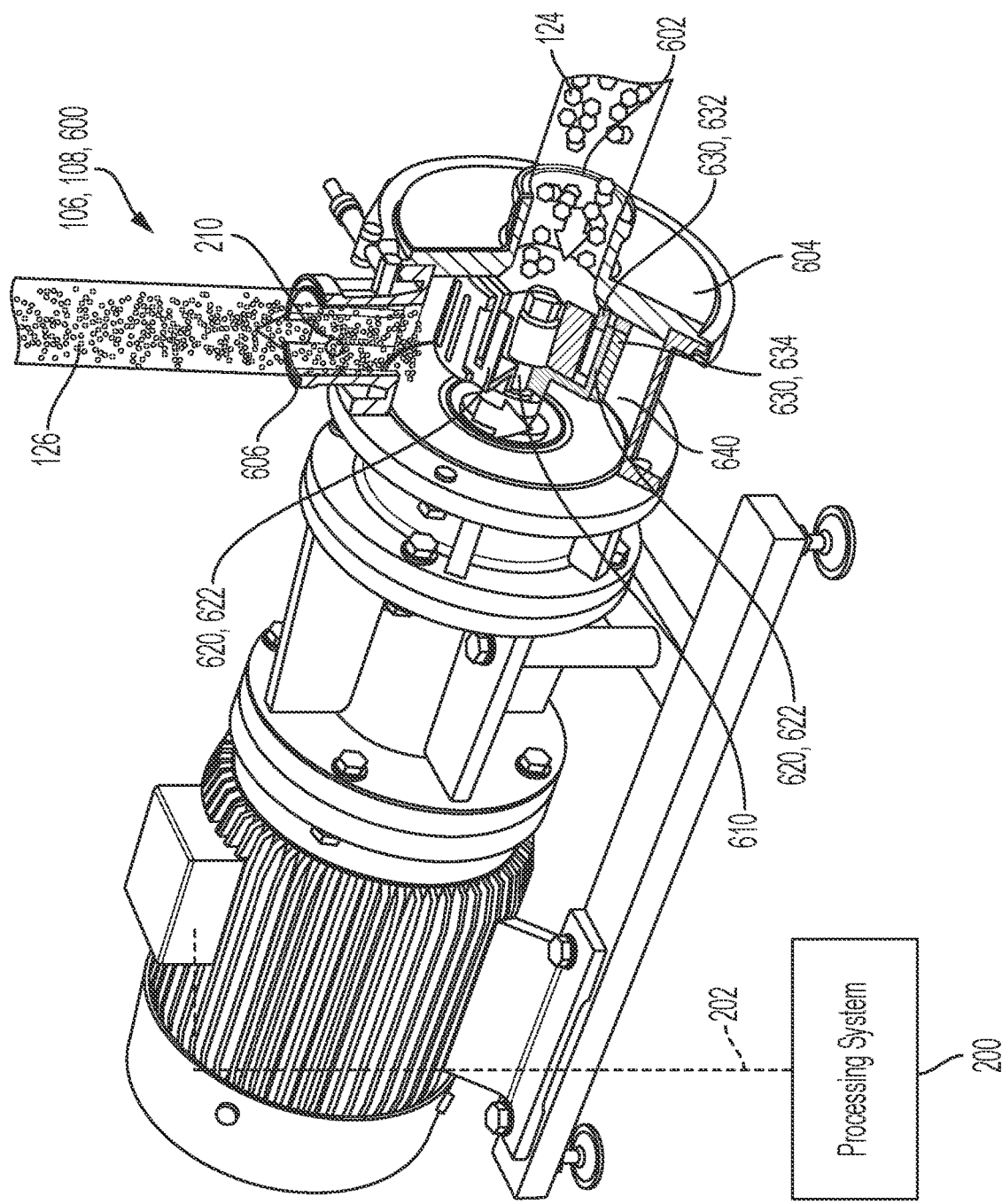
FIG. 9 is an isometric view of an exemplary inline disperser for use in the exemplary chemical production system. A portion of an outer shell of the inline disperser is omitted to offer a cut-away perspective. Various inline dispersers are available from Ystral® at ystral.com/en/machines/z-inlinedispersers/.
Figure 10:
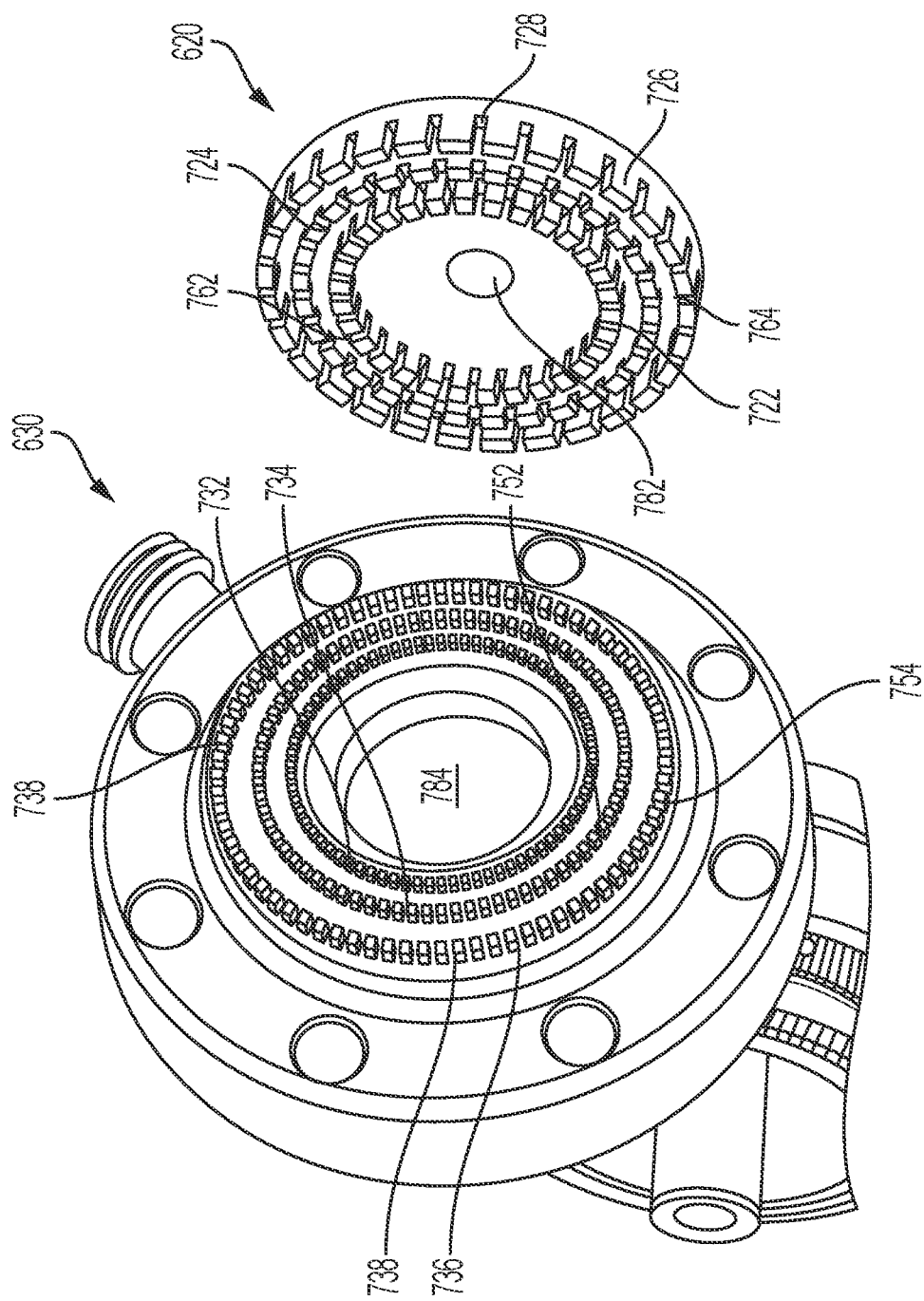
FIG. 10 is a perspective view of an exemplary rotor and stator for use in the exemplary inline disperser of FIG. 9.
Figure 11:
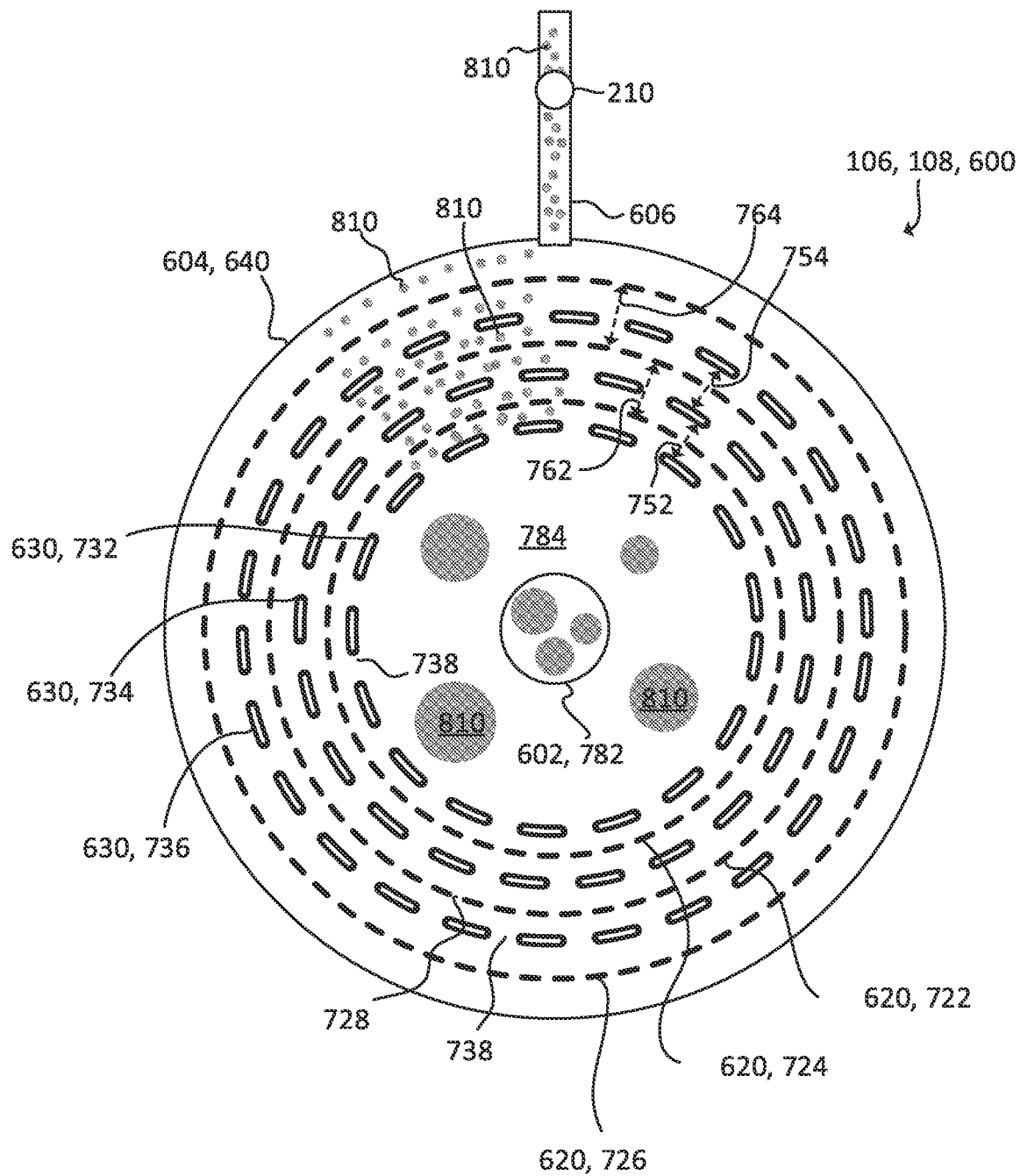
FIG. 11 schematically depicts an exemplary operation of the cutting tool shown in FIG. 10.
Figure 12:
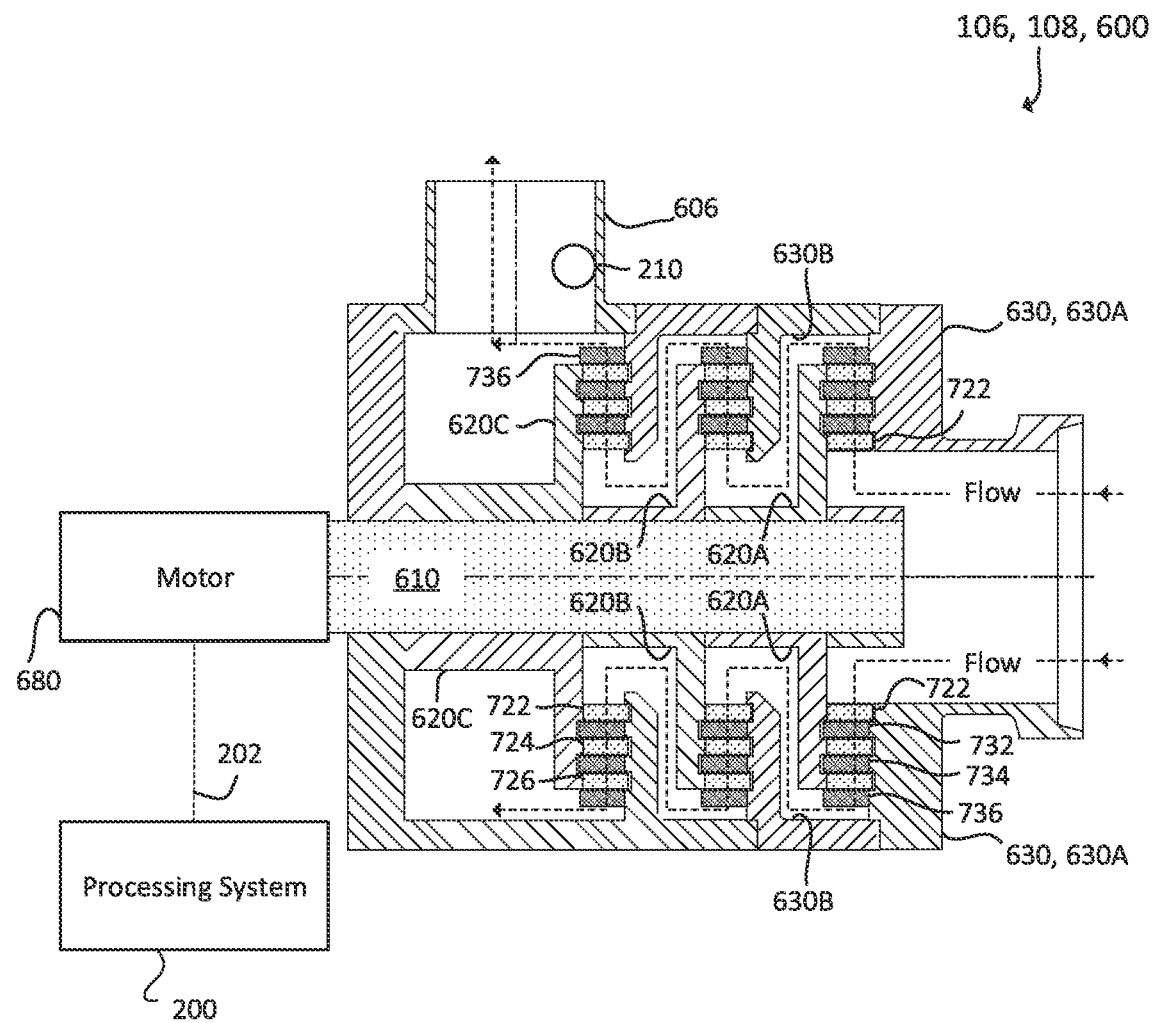
FIG. 12 is a cross-sectional elevational view of an embodiment of the exemplary inline disperser of FIG. 9.

FIG. 9 is an isometric cut-away view of an exemplary inline disperser. Various inline dispersers are available from Ystral® at ystral.com/en/machines/z-inlinedispersers/. FIG. 10 is a perspective view an exemplary cutting tool thereof. FIG. 11 schematically depicts an exemplary operation of the cutting tool shown in FIG. 10. FIG. 12 is a cross-sectional elevational view of the exemplary inline disperser of FIG. 9.

Referring to FIGS. 9-12, and as previously discussed, second processing machine 106 and third processing machine 108 can each be provided as one or more inline dispersers 600. Fluid (e.g., a mixture) can enter core 604 through inlet 602 and depart via outlet 606. Core 604 can define an annular mixing chamber 640 (visible due to the cut-away view of FIG. 9) in which a driveshaft 610, a rotor 620, and a stator 630 are disposed.

In an embodiment, no active fluid/electrical temperature conditioning elements (e.g., resistive heating elements, refrigeration/heat pump loops, fans) are active within mixing chamber 640 of second processing machine 106 and the temperature of material reacted therein is uniform (e.g., exhibits a maximum gradient of less than 10, 5, 3, 2, or 1° C.). In an embodiment, no active temperature conditioning elements (e.g., resistive heating elements, refrigeration/heat pump loops, fans) of second processing machine 106 are controlled based on a temperature of first mixture 124, second mixture 126, or the material reacted within mixing chamber 640.

In an embodiment, temperature of material reacted within second processing machine 106 is exclusively actively regulated through rotational speed control of the cutting tool. In an embodiment, friction between the reacted material and the cutting tool is responsible for at least 85, 90, 95, or 99% of heat absorbed into reacted material within second processing machine 106.

Driveshaft 610 can extend out of mixing chamber 640 to an electric motor 680 (see FIG. 12) configured to rotationally power driveshaft 610. Referring to FIG. 9, rotor 620 can be secured to driveshaft 610 while stator 630 can be statically affixed to outer body 608. Therefore, rotation of driveshaft 610 can cause rotor 620 to spin while stator 630 remains static. The combination of driveshaft 610, rotor 620, and/or stator 630 can be called a cutting tool.

Referring to FIG. 9, stator 630 can include an inner ring 632 and an outer ring 634 defining a radial gap (not labeled in FIG. 9) therebetween. Rotor 620 can include an intermediate ring 622 disposed in the radial gap. The rotor 620 and stator 630 rings can periodically define radial apertures 728, 738 (labeled in FIG. 10). Referring to FIG. 10, fluid (e.g., a urea thickener heterogeneously dispersed in oil) can flow through inlet 602 to a location radially inward of inner stator ring 632. From there, the fluid can flow radially outward through the radial apertures of inner stator ring 632, through the radial apertures of rotor ring 622, and through the radial apertures of outer stator ring 634.

The fluid can exit core mixing chamber 640 via outlet 606. Spinning of rotor 620 with respect to stator 630 can shear fluid passing therethrough. The shearing action can both heat and homogenize the fluid.

FIGS. 10 and 11 show a rotor 620 and stator 630 with the additional ring layers. Rotor 620 can define inner, intermediate, and outer rings 722, 724, 726. Each of the rotor rings can define periodically disposed radial apertures 728. Stator 630 can define inner, intermediate, and outer rings 732, 734, 736. Each of the stator rings can define periodically disposed radial apertures 738.

Rotor 620 and stator 630 can fit together such that (i) inner rotor ring 722 is disposed directly radially between inner and intermediate stator rings 732, 734 within first stator circumferential channel 752, (ii) intermediate rotor ring 724 is disposed directly radially between intermediate and outer stator rings 734, 736 within second stator circumferential channel 754, and (iii) outer ring 726 is disposed directly radially outward of outer stator ring 736.

Intermediate stator ring 734 can be disposed within first rotor circumferential channel 762 and outer stator ring 736 can be disposed within second rotor circumferential channel 764. As further discussed below with reference to FIG. 12, the relative radial positions of rotor 620 and stator 630 can be swapped.

During operation, and referring to FIGS. 10 and 11, fluid including agglomerated particles 810 can flow from inlet 602, through a central aperture 782 defined in rotor 620, and into the central void 784 of stator 630, 730. From there, the fluid can serially advance through the rings 732, 722, 734, 724, 736, 726 by way of the radial apertures 728, 738.

The spinning of rotor 620 with respect to stator 630 can shear fluid passing therethrough. The shearing action can both heat and homogenize the fluid (e.g., de-agglomerate the particles 810). FIG. 11 shows de-agglomerated particles 810 only occupying a sector of core mixing chamber 640 for convenience. During operation, particles 810 can be dispersed throughout.

FIG. 12 shows an example of inline disperser 600 with multiple rotor and stator stages. Various multi-stage inline dispersers are known in the art. In the depicted embodiment, a first rotor 620A and a first stator 630A can define a first stage, a second rotor 620B and a second stator 630B can define a second stage, and a third rotor 620C and a third stator 630C can define a third stage. Fluid can sequentially advance through the first, second, and third stages as shown in the broken-line flow path.

As shown in FIG. 12, the relative positions of rotor 620 and stator 630 can be swapped (compared with the embodiments depicted in FIGS. 10 and 11) such that inner rotor ring 722 is directly radially inwards of inner stator ring 732, intermediate rotor ring 724 is directly radially inwards of intermediate stator ring 734, and outer rotor ring 726 is directly radially inwards of outer stator ring 736.

Although shown in cross-section, the rotor and stator rings are stippled for clarity (the stator rings being more densely stippled than the rotor rings). In each respective stage, fluid can serially advance through the rotor and stator rings by way of radial apertures 728, 738 (present in the embodiment of FIG. 12 but not shown due to the plane of cross section) in the following order: 722, 732, 724, 734, 726, 736.

Referring to FIG. 12, fourth precursor 122D (e.g., the additives) can be piped into third processing machine 108, and thus second mixture 126, at a point (not shown) directly downstream of first rotor stage 620A and directly upstream of second rotor stage 620B.

IV.2

Figure 13:
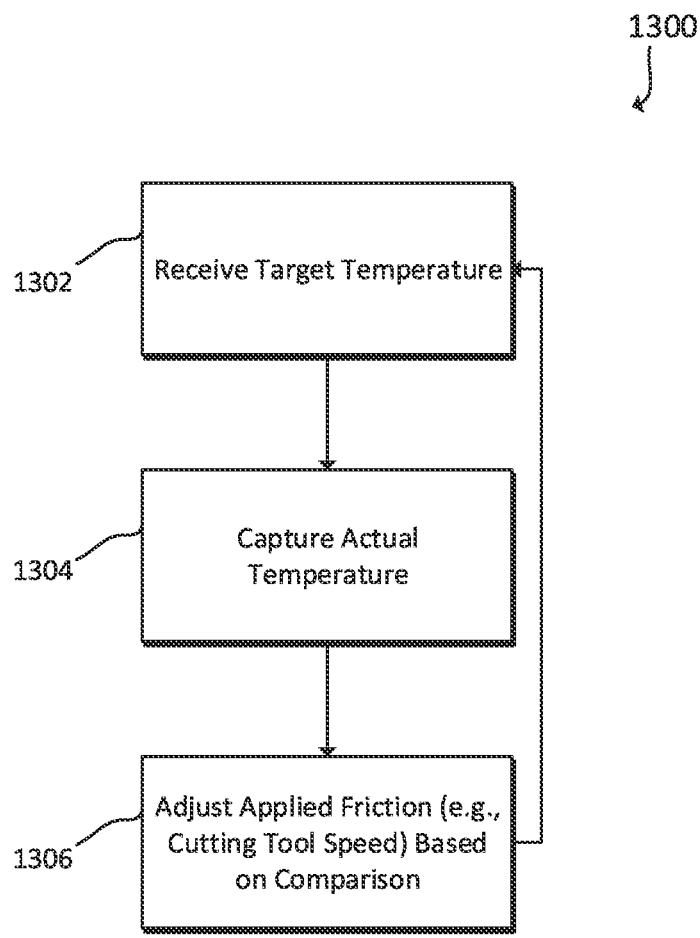
FIG. 13 is a block diagram of an exemplary method of controlling a processing machine as the exemplary inline disperser of FIG. 9.

FIG. 13 presents a first method 1300 for controlling any of the processing machines disclosed herein. First method 1300 can be used to control second processing machine 106 (e.g., inline disperser 600). At block 1302, processing system 200 can determine (e.g., receive) a target temperature (e.g., 150° C.) for material exiting inline disperser 600 (e.g., second mixture 126) via outlet 606. The target temperature can include a range (e.g., 150° C.±2° C.).

At block 1304, processing system 200 can determine (e.g., capture) an actual temperature of material egressing through outlet 606. Processing system 200 can do so by recording a temperature of second mixture 126 departing inline disperser 600 through outlet 606 with a sensor package 230 of a flow control module 210 disposed along outlet 606 (see FIGS. 3, 6, and 8).

At block 1306, processing system 200 can adjust the friction applied by inline disperser 600 based on the information determined during blocks 1302 and 1304 (e.g., based on the target temperature range and temperature estimate). If the estimated temperature within outlet 606 exceeds the target temperature, then processing system 200 can decelerate the cutting tool of inline disperser 600.

Processing system 200 can decelerate the cutting tool at a magnitude based on the difference between the estimated temperature and the target temperature. For example, the magnitude of deceleration can be positively proportional to the difference. If the target temperature exceeds the estimated temperature within outlet 606, then processing system 200 can accelerate the cutting tool of inline disperser 600. Processing system 200 can accelerate the cutting tool at a magnitude based on the difference between the estimated temperature and the target temperature. For example, the magnitude of acceleration can be positively proportional to the difference.

In an embodiment, processing system 200 can determine the target temperature based on a determined (e.g., estimated) composition of first mixture 124. Processing system 200 can determine the composition of first mixture 124 based on the relative flow rate of each precursor 102 into first processing machine 104. For example, if the mass or volumetric ratio of first precursor 102A to second precursor 102B is 1:2, then processing system 200 can set a first target temperature (e.g., 145° C.) while if the same ratio is 1:1, then processing system 200 can set a second target temperature (e.g., 155° C.). Processing system 200 can determine the target temperature based on a determined viscosity of first mixture 124.

Figure 14:
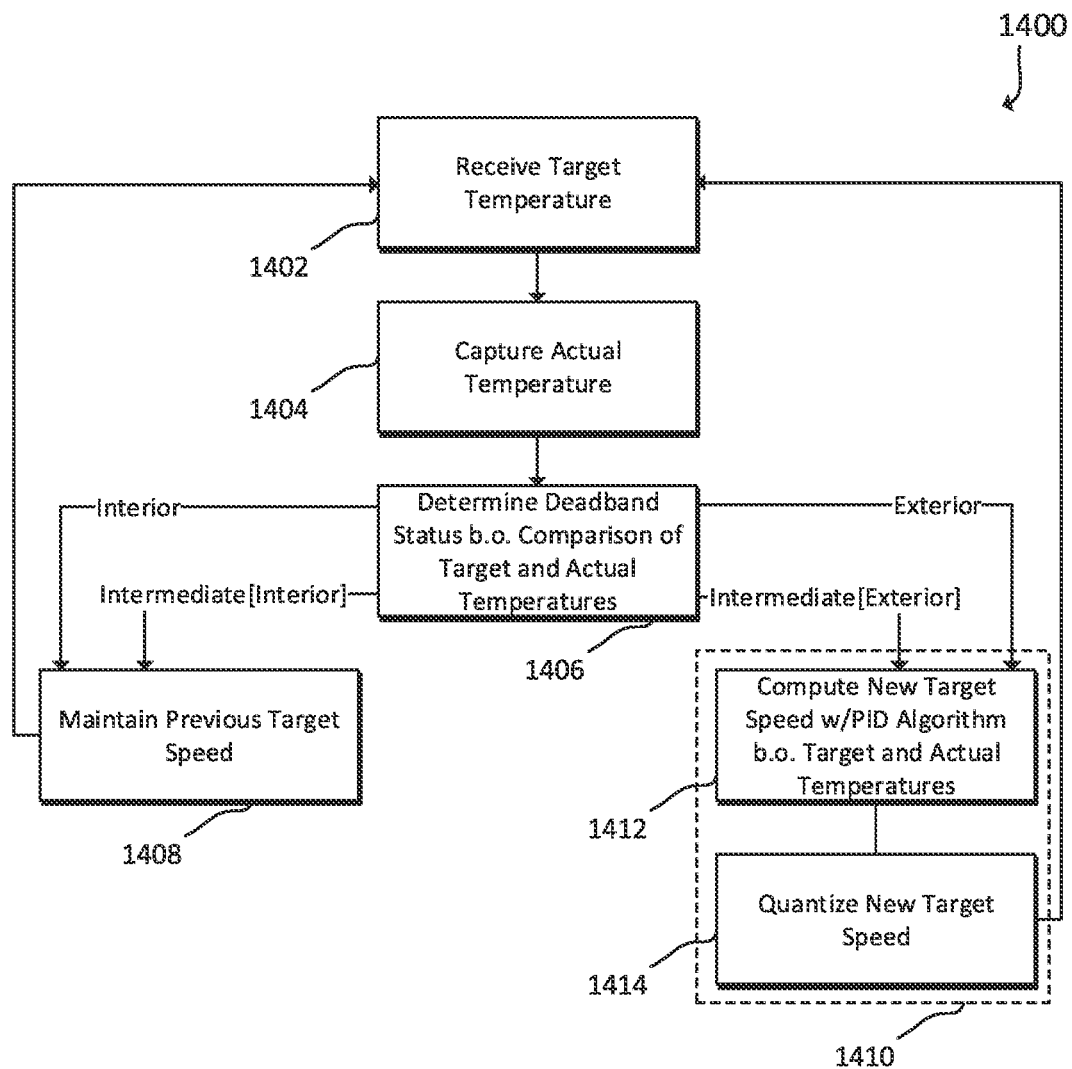
FIG. 14 is a block diagram of an exemplary method of controlling a processing machine such as the exemplary inline disperser of FIG. 9.

FIG. 14 presents a second method 1400 for controlling any of the processing machines disclosed herein. Second method 1400 can be an embodiment of first method 1300 and used to control second processing machine 106 (e.g., inline disperser 600). In the following description, any discussion specific to inline disperser 600 can be generically applied to a different processing machine (e.g., pre-mixer 400).

At block 1402, processing system 200 can determine (e.g., select) a target temperature for material exiting inline disperser 600 (e.g., second mixture 126) via outlet 606. Although each cycle of method 1400 can return to block 1402, the target temperature can be constant.

At block 1404, processing system 200 can determine (e.g., capture) an actual temperature of material (e.g., second mixture 126) egressing through outlet 606. Processing system 200 can do so by measuring a temperature of second mixture 126 departing inline disperser 600 through outlet 606 with a sensor package 230 of a flow control module 210 disposed along outlet 606 (see FIG. 12). The actual temperature can be a running average of sensor measurements captured over a predetermined amount of time (e.g., one second).

At block 1406, processing system 200 can compare the actual temperature with the target temperature to determine a current deadband status.

Figure 15:
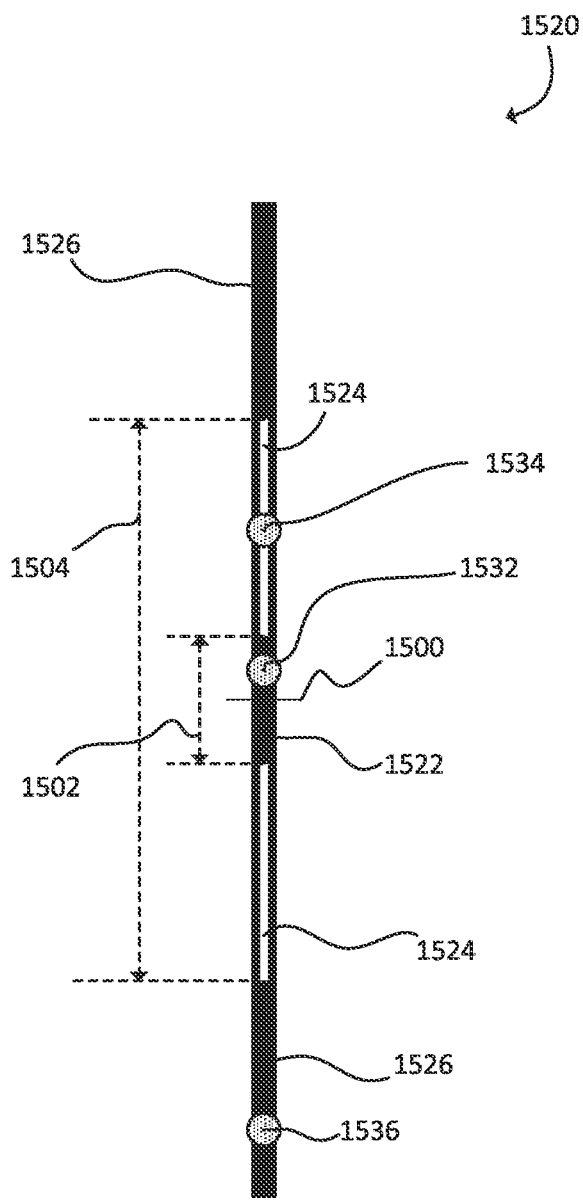
FIG. 15 schematically presents an exemplary asymmetric deadband set.

Referring to FIG. 15, the target temperature of block 1402 can include a point temperature 1500 (e.g., 175° C.) and a deadband set (also called a "control band set"). As further discussed below, the position of the actual temperature with respect to the deadband set can govern how processing system 200 adjusts the target rotational speed of inline disperser 600.

The deadband set can be an asymmetric set including an inner deadband 1502 (e.g., 175° C.±0.1, 0.2, or 0.5° C.) and a corresponding outer deadband 1504 (e.g., 175° C.±1, 2, or 5° C. respectively). Inner deadband 1502 is also called a first deadband and outer deadband 1504 is also called a second deadband. As further discussed below, the term asymmetric can refer to the disparate manner in which processing system 200 treats temperatures falling outside inner deadband 1502 but within outer deadband 1504.

An actual temperature within inner deadband 1502 (and thus occupying the central black region 1522 along temperature line 1520) can have an interior deadband status. First temperature measurement 1532 has an interior deadband status. An actual temperature existing within outer deadband 1504 but outside narrow deadband 1504 (and thus occupying one of the two white regions 1524 along temperature line 1520) can have an intermediate status. Second temperature measurement 1534 has an intermediate deadband status. An actual temperature existing outside outer deadband 1504 (and thus occupying one of the two outer black regions 1526 along temperature line 1520) can have an exterior status. Third temperature measurement 1536 has an exterior deadband status.

At block 1406 (see FIG. 14), and if the actual temperature has an intermediate status, processing system 200 can determine (e.g., look-up) the last non-intermediate deadband status (indicated between brackets in FIG. 14). If the last non-intermediate deadband status was interior, then processing system 200 can proceed to block 4108. If the last non-intermediate deadband status was exterior, then processing system can proceed to block 1410.

According to an embodiment, point temperature 1500 is 172° C., the narrow/inner deadband 1502 is [172° C.−0.3° C., 172° C.+0.4° C.] and the wide/outer deadband 1504 is [172° C.−2° C., 172° C.+3° C.]. The following is a time series of actual temperatures: [178° C. at time T−6, 175° C. at time T−5, 174° C. at time T−4, 172.1° C. at time T−3, 175° C. at time T−2, 170° C. at time T−1, and 168° C. at time T]. According to the target temperature and an embodiment of method 1400 discussed above, the time series would result in the following statuses: [Exterior at time T−6, Intermediate[Exterior] at time T−5, Intermediate[Exterior] at time T−4, Interior at time T−3, Intermediate[Interior] at time T−2, Intermediate[Interior] at time T−1, and Exterior at time T].

According to an embodiment, point temperature 1500 is 180° C., the narrow/inner deadband 1502 is [180° C.−0.1° C., 180° C.+0.1° C.] and the wide/outer deadband 1504 is [180° C.−1° C., 180° C.+1° C.]. The following is a time series of actual temperatures: [175° C. at time T−6, 179.9° C. at time T−5, 179.1° C. at time T−4, 180.6° C. at time T−3, 181.1° C. at time T−2, 180.2° C. at time T−1, and 180.1° C. at time T]. According to the target temperature and an embodiment of method 1400 discussed above, the time series would result in the following statuses: [Exterior at time T−6, Interior at time T−5, Intermediate[Interior] at time T−4, Intermediate[Interior] at time T−3, Exterior at time T−2, Intermediate[Exterior] at time T−1, and Interior at time T].

At block 1408, processing system 200 can maintain the previous target speed of inline disperser 600 (i.e., set the new target speed as the previous target speed). Otherwise, and at block 1410, processing system 200 can compute a new target speed based on the target temperature and the actual temperature.

After both block 1408 and block 1410, processing system 200 can cause driveshaft 710 to rotate at the current target speed. For example, processing system 200 can cause driveshaft 710 to rotate at the current target speed by implementing a control algorithm configured to cause driveshaft 710 to rotate at the current target speed.

Block 1410 can include one or both of blocks 1412 and 1414. At block 1412, processing system 200 can apply a proportional-integral-derivative ("PID") algorithm to compute (i.e., determine) a new target speed based on the target temperature and the actual temperature.

The asymmetric nature of the exemplary inner and outer deadbands 1502, 1504 enable processing system 200 to avoid oscillating the target speed in response to minor fluctuations of the actual temperature. For example, if the actual temperature is within the inner deadband 1502, processing system 200 will decline to adjust the target speed until the actual temperature falls outside the outer deadband 1504. However, if the actual temperature is outside the outer deadband 1504, processing system 200 will continue to adjust the target speed until the actual temperature exists within the inner deadband 1502.

At block 1414, processing system 200 can quantize (e.g., round, truncate) the new target speed to one of a plurality of discrete values. For example, processing system 200 can express the target speed on a scale of 0-100 and be configured to quantize the new target speed to the nearest value ending in "0" (e.g., 0, 10, 20, 30, 40, etc.). Due to the quantization process, the new target speed can be rounded (e.g., truncated) to a value equal to the previous target speed.

In an embodiment, system 100 would be capable of controlling the rotational speed to differentially implement consecutive non-quantized values in the absence of block 1414. For example, system 100 is capable, in the absence of block 1414, of causing driveshaft 710 to rotate at a first rate when the target speed is 51% (e.g., 51% of the predetermined maximum possible speed) and at a second, different rate when the target speed is 52%. Put differently, block 1414 enables processing system 200 to control speed of driveshaft 710 at a lower resolution while processing system 200 would be otherwise capable of controlling speed of driveshaft 710 at a higher, more detailed, resolution.

According to an embodiment of the quantization process, processing system 200 calculates, with the PID algorithm, the new target speed as a percentage of the maximum possible speed (0-100%). In an embodiment, processing system 200 can scale the percentage to a bit value ranging from to 0-a predetermined maximum (e.g., 24768). To avoid unnecessary oscillation, processing system 200 can, in an embodiment, apply a bitmask along and/or a bitwise AND operator to set the last bits to 0. For a bitmask with 0xFFF0, for example, processing system 200 can be configured to change the output to inline disperser 600 only if there is a change in steps of 16 or 0x0010. If the maximum output (e.g., 24768) cannot be reached due to the bitwise AND, then processing system 200 can ignore the bitmask if the bit value exceeds a lesser predetermined value (e.g., 24760).

The PID algorithm that processing system 200 applies can include an anti-windup measure to paralyze or deactivate the integration component (i.e., the "I" in "PID") in the presence of certain factors. In an embodiment, processing system 200 can perform the anti-windup measure when the target speed is outside a predetermined range (e.g., outside a range of 25-75% of the maximum possible target speed).

Processing system 200 can determine the target temperature (and thus the point temperature and size of each deadband) along with the size of the anti-windup range based on a state of the material entering inlet 602. In an embodiment, processing system 200 can approximate the state as a function of (i.e., and thus base the target temperature and anti-windup range on) one or more of the following factors: (i) a composition of each precursor 122 used to make first mixture 124, (ii) a relative ratio of each precursor 122 used to make first mixture 124, (iii) a measured temperature of first mixture 124, (iv) a measured viscosity of first mixture 124, and/or (iv) a measured flow rate (e.g., mass flow rate) of first mixture 124.

Processing system 200 can account for factor propagation delay based on the measured flow rate. Propagation delay can occur when a change in a factor (e.g., composition of first precursor 122) takes time to reach inline disperser 600. Therefore, processing system 200 can use the mass flow rate to determine which previous measurements from upstream sensors apply to the portion of first mixture 124 currently reacted within inline disperser 600, then rely on those earlier sensor measurements.

For example, if flow rate indicates that the portion of first mixture 124 currently reacted at time T within inline disperser 600 resulted from the portion of first mixture 124 emerging from first processing machine 104 at time T−1, then processing system 200 can rely on sensor measurements about the composition of each precursor 122 used to make first mixture 124 captured at time T−2. Therefore, processing system 200 can preserve a history for each sensor. Each entry in the history can include a time-stamp and a sensor reading. Processing system 200 can determine, based on the mass flow rate, the one or more sensor readings from each history that measured the specific section of first mixture 124 currently reacted within inline disperser 600.

V

Figure 16:
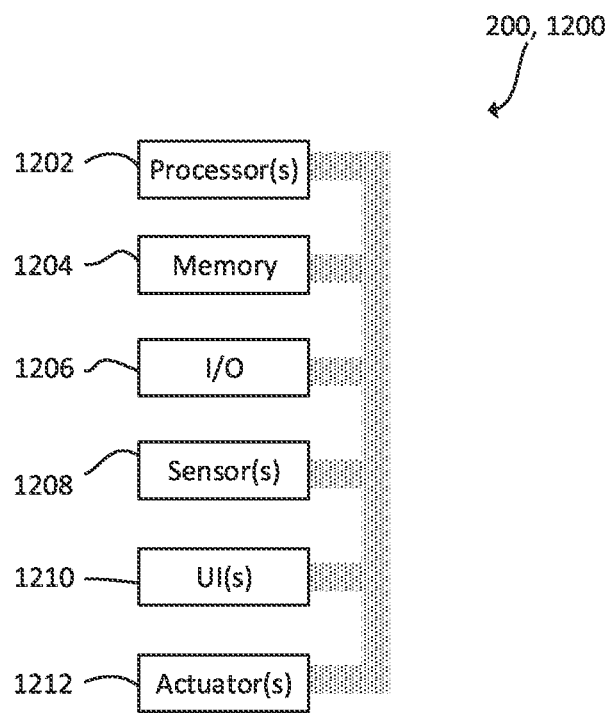
FIG. 16 is a block diagram of an exemplary processing system. The processing system can be configured to perform any of the methods (e.g., operations) disclosed in the present application.

Referring to FIG. 16, processing system 200, 1200 can include one or more processors 1202, memory 1204, one or more input/output devices 1206, one or more sensors 1208, one or more user interfaces 1210, and one or more actuators 1212. As further discussed below, processing system 1200 can be distributed. For example, some components of processing system 1200 can be disposed inside a server and some can be disposed within first processing machine 104, second processing machine 106, etc.

Processors 1202 can include one or more distinct processors, each having one or more cores. Each of the distinct processors can have the same or different structure. Processors 1202 can include one or more central processing units (CPUs), one or more graphics processing units (GPUs), circuitry (e.g., application specific integrated circuits (ASICs)), digital signal processors (DSPs), and the like. Processors 1202 can be mounted on a common substrate or to different substrates. For example, some processors 1202 can be disposed in a first inline disperser 600 while other processors 1202 can be disposed in a second inline disperser 600.

Processors 1202 are configured to perform a certain function, method, or operation at least when one of the one or more of the distinct processors is capable of implementing code (e.g., interpreting scripts), stored on memory 1204 embodying the function, method, or operation. Processors 1202, and thus processing system 1200, can be configured to perform, automatically, any and all functions, methods, and operations disclosed herein.

For example, when the present disclosure states that processing system 1200 performs/can perform task "X" (or that task "X" is performed), such a statement should be understood to disclose that processing system 1200 can be configured to perform task "X". Processing system 1200 is configured to perform a function, method, or operation at least when processors 1202 are configured to do the same.

Memory 1204 can include volatile memory, non-volatile memory, and any other medium capable of storing data. Each of the volatile memory, non-volatile memory, and any other type of memory can include multiple different memory devices, located at multiple distinct locations and each having a different structure. Memory 1204 can include cloud storage.

Examples of memory 1204 include a non-transitory computer-readable media such as RAM, ROM, flash memory, EEPROM, any kind of optical storage disk such as a DVD, a Blu-Ray® disc, magnetic storage, holographic storage, an HDD, an SSD, any medium that can be used to store program code in the form of instructions or data structures, and the like. Any and all of the methods, functions, and operations described in the present application can be fully embodied in the form of tangible and/or non-transitory machine-readable code (e.g., scripts) saved in memory 1204.

Input-output devices 1206 can include any component for trafficking data such as ports, antennas (i.e., transceivers), printed conductive paths, and the like. Input-output devices 1206 can enable wired communication via USB®, DisplayPort®, HDMI®, Ethernet, PROFIBUS, PROFINET, and the like. Input-output devices 1206 can enable electronic, optical, magnetic, and holographic, communication with suitable memory 1206. Input-output devices 1206 can enable wireless communication via WiFi®, Bluetooth®, cellular (e.g., LTE®, CDMA®, GSM®, WiMax®, NFC®), GPS, and the like. Input-output devices 1206 can include wired and/or wireless communication pathways.

Sensors 1208 can capture physical measurements of environment and report the same to processors 1202. User interface 1210 can include displays, physical buttons, speakers, microphones, keyboards, and the like. Actuators 1212 can enable processors 1202 to control mechanical forces. Actuators 1212 can include inverters or other mechanisms for controlling rotational speed.

Processing system 1200 can be distributed (e.g., across multiple processing machines). Processing system 1200 can have a modular design where certain features have a plurality of the aspects shown in FIG. 16. For example, I/O modules can include volatile memory and one or more processors.

While embodiments of the invention have been illustrated and described in detail in the drawings and foregoing description, such illustration and description are to be considered illustrative or exemplary and not restrictive. Changes and modifications may be made by those of ordinary skill within the scope of the following claims. In particular, the present invention covers further embodiments with any combination of features from different embodiments described above and below. Statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

We claim:

1. A production method comprising:
   flowing a heterogeneous fluid mixture into contact with a homogenizing cutting tool, wherein the fluid mixture is a lubricant;
   measuring a fluid mixture temperature so as to obtain a measured fluid mixture temperature and determining a target fluid mixture temperature;
   frictionally heating the fluid mixture so as to obtain a heated and homogenized fluid mixture by driving the cutting tool at a rate based on (i) the target fluid mixture temperature and (ii) the measured fluid mixture temperature; and
   flowing the heated and homogenized fluid mixture away from the cutting tool.

2. The method of claim 1, wherein (i) the target fluid mixture temperature is a target temperature of the heated and homogenized fluid mixture and (ii) the measured fluid mixture temperature is a measured temperature of the heated and homogenized fluid mixture.

3. The method of claim 2, wherein the heterogeneous fluid mixture comprises urea thickener heterogeneously dispersed within a base oil and the heated and homogenized fluid mixture comprises urea grease.

4. The method of claim 1, wherein the lubricant is selected from a group consisting of oils, emulsions, greases, soaps, and combinations thereof.

5. The method of claim 1, wherein the rate is a target rotational speed, the measured fluid mixture temperature is a current measured fluid mixture temperature, and the method further comprises updating the target rotational speed based on (i) the target fluid mixture temperature, (ii) the current measured fluid mixture temperature, and (iii) an asymmetric deadband set.

6. The method of claim 5, wherein the asymmetric deadband set comprises an inner deadband and an outer deadband and the method further comprises:
updating the target rotational speed based on a deadband status of a previous measured fluid mixture temperature when the current measured fluid mixture temperature is outside the inner deadband and inside the outer deadband.

7. The method of claim 6, further comprising:
updating the target rotational speed based on the deadband status of the previous measured fluid mixture temperature by:
setting the updated target rotational speed as being equal to a current target rotational speed when the current measured fluid mixture temperature is outside the inner deadband, inside the outer deadband, and a last measured fluid mixture temperature inside the inner deadband is more recent than a last measured fluid mixture temperature outside the outer deadband; and
calculating the updated target rotational speed based on a difference between the current measured fluid mixture temperature and the target temperature when the current measured fluid mixture temperature is outside the inner deadband, inside the outer deadband, and a last measured fluid mixture temperature inside the inner deadband is less recent than a last measured fluid mixture temperature outside the outer deadband.

8. The method of claim 7, comprising quantizing the updated target rotational speed to one of a plurality of discrete values to lower a resolution of rotational speed control.

9. The method of claim 5, comprising:
mixing a plurality of precursors into the heterogeneous fluid mixture; and
determining the target fluid mixture temperature and the asymmetric deadband set based on a flow rate of each precursor.

10. The method of claim 1, wherein the homogenizing cutting tool comprises a rotor affixed to a driveshaft and a stator, the rotor comprising a rotor ring disposed in a circumferential channel defined between sequential stator rings.

11. The method of claim 1, further comprising:
continuously flowing a plurality of precursors into a pre-mixer to produce the heterogeneous fluid mixture;
continuously flowing the heterogeneous fluid mixture into an inlet of a first inline disperser comprising the homogenizing cutting tool; and
continuously introducing an additive into the heated and homogenized fluid mixture at a location downstream of the first inline disperser and continuously flowing the combination within a second inline disperser comprising a second homogenizing cutting tool.

12. A production system comprising a processing system and a homogenizing cutting tool, the production system being configured to:
flow a heterogeneous fluid mixture into contact with the homogenizing cutting tool;
frictionally heat the fluid mixture by driving the cutting tool so as to obtain a heated and homogenized fluid mixture; and
flow the heated and homogenized fluid mixture away from the cutting tool;
wherein the processing system comprises one or more processors configured to:
measure a fluid mixture temperature so as to obtain a measured fluid mixture temperature and determine a target fluid mixture temperature; and
drive the cutting tool at the rate based on (i) the target fluid mixture temperature and (ii) the measured fluid mixture temperature, and
continuously flow a plurality of precursors into a pre-mixer to produce the heterogeneous fluid mixture;
continuously flow the heterogeneous fluid mixture into an inlet of a first inline disperser comprising the homogenizing cutting tool; and
continuously introduce an additive into the heated and homogenized fluid mixture and continuously flowing the combination within a second inline disperser comprising a second homogenizing cutting tool.

13. The production system of claim 12, wherein (i) the target fluid mixture temperature is a target temperature of the heated and homogenized fluid mixture and (ii) the measured fluid mixture temperature is a measured temperature of the heated and homogenized fluid mixture.

14. The production system of claim 13, wherein the heterogeneous mixture comprises urea thickener heterogeneously dispersed within a base oil and the heated and homogenized mixture comprises urea grease.

15. The production system of claim 12, wherein the rate is a target rotational speed, the measured fluid mixture temperature is a current measured fluid mixture temperature, and the one or more processors are configured to:
update the target rotational speed based on (i) the target fluid mixture temperature, (ii) the current measured fluid mixture temperature, and (iii) an asymmetric deadband set comprising an inner deadband and an outer deadband; and
update the target rotational speed based on a deadband status of a previous measured fluid mixture temperature when the current measured fluid mixture temperature is outside the inner deadband and inside the outer deadband by:
setting the updated target rotational speed as being equal to a current target rotational speed when the current measured mixture temperature is outside the inner deadband, inside the outer deadband, and a last measured mixture temperature inside the inner deadband is more recent than a last measured mixture temperature outside the outer deadband; and
calculating the updated target rotational speed based on a difference between the current measured mixture temperature and the target temperature when the current measured mixture temperature is outside the inner deadband, inside the outer deadband, and a last measured mixture temperature inside the inner deadband is less recent than a last measured mixture temperature outside the outer deadband.

16. A urea grease production system comprising:
(a) a first tank for storing a first precursor and a second tank for storing a second precursor;
(b) a premixer for producing a first fluid mixture comprising urea thickener particles heterogeneously dispersed in a base oil from the first precursor and the second precursor, the premixer being disposed downstream of the first and second tanks and comprising:
a first inlet for receiving the first precursor,
a second inlet for receiving the second precursor,
a stirring assembly disposed in a mixing chamber for producing the first fluid mixture, and an outlet for continuously flowing the first fluid mixture out of the premixer; and (c) a first inline disperser for producing a second fluid mixture comprising urea grease by heating and homogenizing the first fluid mixture, the first inline disperser being disposed downstream of the premixer and configured to receive the first fluid mixture from the premixer, the first inline disperser comprising:
an inlet for receiving the first fluid mixture,
an outlet for flowing the second fluid mixture toward the second inline disperser, and
a cutting tool disposed in a mixing chamber and comprising a plurality of radially alternating rotor stages and stator stages; and (d) a processing system comprising one or more processors configured to control a rotational speed of the plurality of rotor stages based on a target fluid mixture temperature, a measured fluid mixture temperature, and an asymmetric deadband set comprising an inner deadband and an outer deadband.

17. The production system of claim 16, wherein the stirring assembly comprises:
a stator assembly comprising a plurality of longitudinally displaced columns statically disposed within the mixing chamber; and
a driveshaft mounting multiple paddles, a plurality of which are configured to rotate through gaps defined between consecutive columns.

18. The production system of claim 16, wherein the measured fluid mixture temperature is a measured current fluid mixture temperature, the asymmetric deadband set comprises an inner deadband and an outer deadband, and the one or more processors are configured to:

control the rotational speed of the plurality of rotor stages based on a deadband status of a measured previous fluid mixture temperature when the measured current fluid mixture temperature is outside the inner deadband and inside the outer deadband.

19. The production system of claim 18, wherein the one or more processors are configured to:
quantize a target rotational speed of the plurality of rotor stages to one of a plurality of predetermined discrete values to reduce a resolution of rotational speed control.

20. A production method comprising:
flowing a heterogeneous fluid mixture into contact with a homogenizing cutting tool;
measuring a fluid mixture temperature so as to obtain a measured fluid mixture temperature and determining a target fluid mixture temperature;
frictionally heating the fluid mixture so as to obtain a heated and homogenized fluid mixture by driving the cutting tool at a rate based on (i) the target fluid mixture temperature and (ii) the measured fluid mixture temperature; and
flowing the heated and homogenized fluid mixture away from the cutting tool,
wherein the rate is a target rotational speed, the measured fluid mixture temperature is a current measured fluid mixture temperature, and the method further comprises updating the target rotational speed based on (i) the target fluid mixture temperature, (ii) the current measured fluid mixture temperature, and (iii) an asymmetric deadband set.

* * * * *